(12) United States Patent
Morse et al.

(10) Patent No.: US 8,568,686 B2
(45) Date of Patent: Oct. 29, 2013

(54) SYNTHESIS OF THIN FILMS AND MATERIALS UTILIZING A GASEOUS CATALYST

(75) Inventors: Daniel E. Morse, Santa Barbara, CA (US); Birgit Schwenzer, Goleta, CA (US); John R. Gomm, Santa Barbara, CA (US); Kristian M. Roth, Bothell, WA (US); Brandon Heiken, Goleta, CA (US); Richard Brutchey, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 1265 days.

(21) Appl. No.: 11/737,087

(22) Filed: Apr. 18, 2007

(65) Prior Publication Data
US 2007/0254141 A1    Nov. 1, 2007

Related U.S. Application Data

(63) Continuation-in-part of application No. PCT/US2005/037421, filed on Oct. 18, 2005.

(60) Provisional application No. 60/620,147, filed on Oct. 18, 2004.

(51) Int. Cl.
*C01G 51/00*      (2006.01)
*B32B 18/00*      (2006.01)

(52) U.S. Cl.
USPC .............. 423/592.1; 423/594.19; 423/610; 423/594.9; 423/622; 423/305; 423/306; 423/593.1; 427/96.7; 427/96.8; 427/255.23; 427/255.28; 427/255.31; 427/255.38

(58) Field of Classification Search
USPC ......... 423/592.1–594.19, 304–315, 335–338; 427/96.7, 96.8, 255.23, 255.28, 427/255.31, 255.38
See application file for complete search history.

(56) References Cited

U.S. PATENT DOCUMENTS

| | | | |
|---|---|---|---|
| 6,764,667 B1* | 7/2004 | Steiner, III | .............. 423/338 |
| 2002/0035032 A1 | 3/2002 | Koper et al. | |
| 2004/0028694 A1 | 2/2004 | Young et al. | |
| 2004/0055509 A1 | 3/2004 | Sato et al. | |

OTHER PUBLICATIONS

Karanikolos, et al., "Synthesis and Size Control of Luminescent ZnSe . . . Technique" Langmuir, Jan. 2004, 20, pp. 550-553.*

* cited by examiner

*Primary Examiner* — Steven Bos
(74) *Attorney, Agent, or Firm* — John P. O'Banion

(57) ABSTRACT

A method for the fabrication of nanostructured semiconducting, photoconductive, photovoltaic, optoelectronic and electrical battery thin films and materials at low temperature, with no molecular template and no organic contaminants. High-quality metal oxide semiconductor, photovoltaic and optoelectronic materials can be fabricated with nanometer-scale dimensions and high dopant densities through the use of low-temperature biologically inspired synthesis routes, without the use of any biological or biochemical templates.

15 Claims, 18 Drawing Sheets

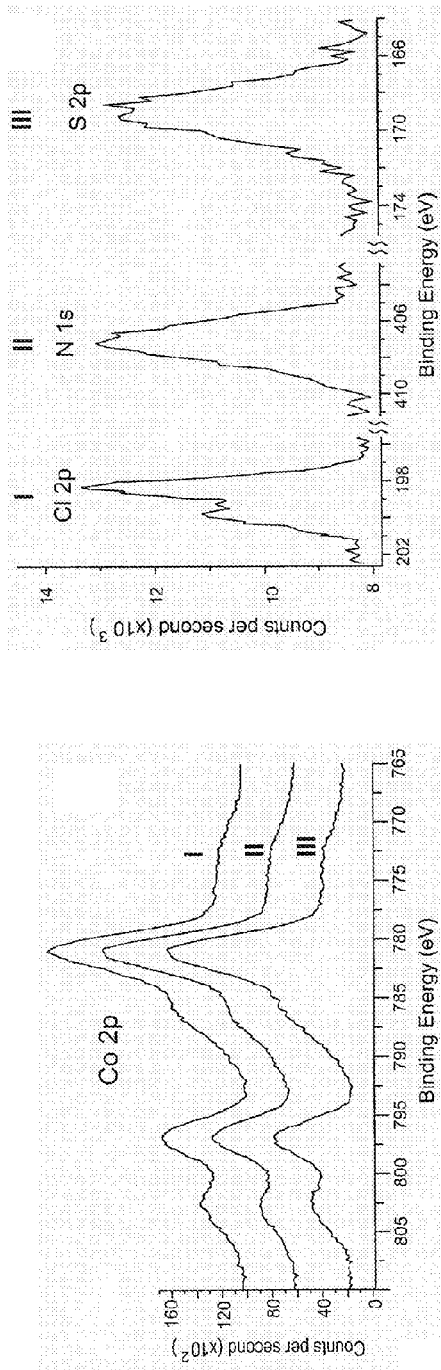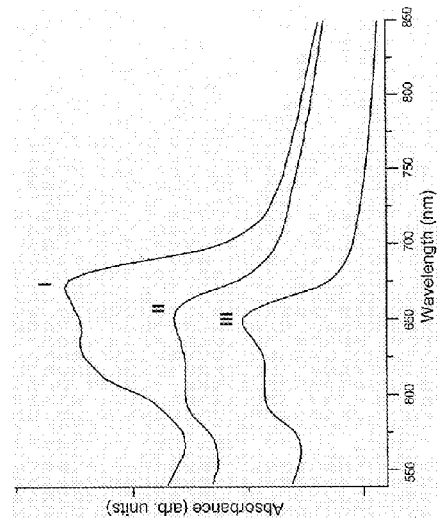
FIG. 5A
FIG. 5B
FIG. 6

SYNTHESIS OF THIN FILMS AND MATERIALS UTILIZING A GASEOUS CATALYST

CROSS-REFERENCE TO RELATED APPLICATIONS

This application claims priority from, and is a 35 U.S.C. §111(a) continuation-in-part of, co-pending PCT international application serial number PCT/US2005/037421, filed on Oct. 18, 2005, incorporated herein by reference in its entirety, which claims priority to U.S. provisional application Ser. No. 60/620,147, filed on Oct. 18, 2004, incorporated herein by reference in its entirety.

This application is related to PCT International Publication No. WO 2006/137915 A2, published on Dec. 28, 2006, incorporated herein by reference in its entirety.

STATEMENT REGARDING FEDERALLY SPONSORED RESEARCH OR DEVELOPMENT

This invention was made with Government support under Grant No. DE-FG03-02ER46006 awarded by the Department of Energy and Grant No. DAAD19-03-D-0004 awarded by the US Army Research Office. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to fabrication of metal hydroxide, phosphate, and oxide semiconductor, photovoltaic and optoelectronic materials, and more particularly to a method for the fabrication of nanostructured semiconducting, photoconductive, photovoltaic, optoelectronic and electrical battery thin films and materials at low temperature, with no molecular template and no organic contaminants, as well as materials fabricated therefrom.

2. Description of Related Art

There are a variety of methods used to deposit layers of material on a substrate, many of which depend on high vacuum and high-energy deposition methods. The three methods listed below are commonly used in research, development, and manufacturing of semiconducting and photovoltaic thin films.

Metal organic chemical vapor deposition (MOCVD) is used to deposit a variety of thin films on solid substrates and enjoys wide application due to the widespread usefulness of oxide superconductors, ferroelectrics, and dielectric materials. This method is the dominant growth technique behind novel device fabrication and is the popular choice of manufacturers in high volume production of epitaxial wafers (the most common form of "computer chips") and devices. The method utilizes a high vacuum chamber and a heated substrate. Simple organometallic compounds are vaporized and passed into the ultra-high vacuum (UHV) chamber and decompose upon contact with the heated substrate leaving behind the metal atom on the surface. The carbon byproduct of the reaction is transported out of the chamber by an inert carrier gas. The parameters for deposition employ growth temperatures from 950-1025° C. and deposition rates of 1-4 µm per hour. Using MOCVD, high purity thin films of a variety of compositions can be deposited on a surface. The kinetic and thermodynamic parameters of the film deposition process are governed by the crucial interdependence of precursor composition, deposition temperature, partial pressure and flow rate. The search for effective precursors and process conditions is active and the balance between precursor volatility and thermal stability remains a particularly difficult challenge.

Molecular beam epitaxy (MBE) is a UHV ($10^{-10}$ to $10^{-14}$ torr) deposition process that introduces reactants using a molecular beam. The beam is created by heating an elemental source in a UHV chamber; it then effuses through a small orifice towards the substrate and subsequently is deposited. Using several sources compound materials can be deposited in as little as one atomic layer. This precise control of film growth results in very accurate material composition with small amounts of defects. Growth occurs one monolayer at a time giving high purity layers but at the cost of very slow deposition rates of usually 0.1-0.5 µm/hr. Therefore MBE is very costly, and only is commercially useful for thin layers typically no more than a few nanometers in thickness.

Liquid phase epitaxy (LPE) is a process in which a substrate is brought into contact with a molten saturated solution of the film material at a temperature high enough to melt a solid source. The substrate is then cooled to initiate crystallization of the semiconductor and its growth as a film on the surface of the substrate. The control of stoichiometry is good in this method and the level of defect formation is low. The solubility of the film constituents is a major limiting factor, however, and application of this method is therefore quite limited. An additional drawback to this method is the fact that morphology of the resulting surface is difficult to control and the surface is often heterogeneous with respect to composition and morphology. Large step edges on the surface called macrosteps are formed during LPE which impede the resolution of structures on the surface. These steps also are a source for compositional inhomogeneities due to build-up of impurities at the step edge. LPE is a high-energy process that relies on high purity solid melts in contact with a cold substrate. The temperature control needs to be precise to prevent internal stresses and cracking due to temperature gradients. The thermal expansion mismatch between a substrate and thin film needs to be engineered and therefore limitations in material combinations are a major problem that plagues this method.

Alternative routes to high purity semiconductor materials to replace these techniques are being explored in response to demands for more flexible and lower energy synthesis strategies. Techniques that mimic biomineralization have received much attention because of the inherently benign conditions of biological syntheses. In addition, these biomineralization processes often produce highly ordered structures on the nanoscopic as well as macroscopic scale.

One such biomineralization process has been studied intensively. Molecular cloning, sequence analyses, and mechanistic studies of the biological synthesis of silica structures in a marine sponge has led to the discovery that this process is mediated by a family of catalytically active, structure-directing enzymes called silicateins.

Purified silicatein fibers are able to catalyze and structurally direct the hydrolysis and polycondensation of silicon alkoxides at low temperature and neutral pH. Silicatein also was used as a catalyst and template for the hydrolysis and subsequent polycondensation of water stable molecular complexes of titanium and gallium to form nanocrystalline $TiO_2$ and $Ga_2O_3$, respectively. However, these nanoparticles remain in intimate contact with the macroscopic (2 μm×1 mm) protein filaments that catalyzed and templated their synthesis; they are therefore largely unsuitable for device applications that require high purity material.

Perovskite materials are of interest because they have a wide range of useful applications, for example, in ferroelectric random access memory (FeRAM), piezoelectric transducers, solid-oxide fuel cells, high-temperature superconductors, thermoelectrics, ferromagnets, capacitors, pyroelectric detectors, and colossal magnetoresistors. Perovskites are traditionally prepared by high-temperature solid-state reactions; specifically, BaTiO3 is prepared by the reaction of TiO2 and BaCO3 at temperatures above 1100° C., which yields a wide range of grain sizes (0.5-3 μm) and provides very little control over the shape of the particles. Consequently, lower-temperature solution-based synthetic routes (for example, sol-gel and hydrothermal methods) are being explored to better control the nanostructure of the BaTiO3 product. The synthesis of BaTiO3 nanoparticles of 6-12 nm by a sol-gel reaction at 100-140° C., in the presence of oleic acid as a stabilizing agent, has been reported. Other researchers have described a nonhydrolytic synthesis of 6 nm BaTiO3 nanoparticles at 200-220° C. The hydrothermal synthesis of well-defined 17 nm BaTiO3 nanoparticles at 180° C. under highly alkaline conditions has also been reported. The low-temperature synthesis of perovskite nanocrystals is inherently difficult; an accurate control over stoichiometry, a close matching of the reaction rates of the precursors, and the identification of special conditions for crystallization (that is, temperature, pressure, and pH) are all critically important. While several examples of successful controlled syntheses of BaTiO3 nanostructures now exist, they rely on elevated reaction temperatures (>140° C.) and/or strongly alkaline conditions for crystallization.

BRIEF SUMMARY OF THE INVENTION

The invention is a low-temperature solution synthetic route for the generation of novel semiconducting, photoconductive, photovoltaic, optoelectronic and battery thin films and materials with unique nanoscale architectures. The resulting materials are synthesized in a concerted reaction that occurs spontaneously at room temperature and results in a structured high purity semiconductor grade material without the use of an organic template.

The synthetic strategy is based on a biologically inspired low-temperature method that involves the hydrolytic catalysis of molecular precursors performed in close conjunction with directed growth of the resulting semiconductor material. The use of a phase-separated molecular precursor and catalyst makes possible critical kinetic and directional control of crystal lattice growth. There is no addition of a molecular template to direct the growing crystal; therefore the material is made in a high purity state without the need for further processing to remove organic or other contaminants, and thus is readily compatible with the standards of ultrahigh purity required both for the manufacture and performance of semiconductors and other optoelectronic materials.

In one specific example of the practice of this invention, the resulting product is electrically continuous over a macroscopic length scale (~1-5 cm) and can be readily transferred to a number of flat conductive or insulating substrates. Electrical measurements indicate that ohmic contact is readily achieved without the need for annealing or alloying to a metallic conductor to make high-quality, low resistivity electrical connections. Tuning and integration of the catalyst and molecular precursors results in the production of unique semiconductor, photoconductive, photovoltaic, optoelectronic and battery thin films and materials of size and quality sufficient for incorporation into electronic, electrical and optoelectronic devices. As an illustration of the usefulness of this invention, we describe the fabrication of a cobalt-based material that had not previously been available through other synthetic routes; this material—with properties useful for photovoltaic and electrical battery applications—is thus new to science and technology.

The general purpose of this invention is to fabricate materials suitable for inclusion in a wide variety of devices that rely on doped semiconductors for electronic, optoelectronic, photovoltaic or other functionality. In some cases, the resulting material may be a metal-oxide, substituted metal oxide, or compound semiconductor that behaves as a p- or n-type material having one flat side suitable for contact to a continuous backplane and one nano- to micro-structured side suitable for the efficient collection of light.

There are five unique aspects that define the utility of this process:

(i) Doping is accomplished by adjusting starting solution conditions with an almost limitless amount of possible dopants. Possible dopants include but are not limited to chloride, nitrate and sulfate and are dependant on the composition of the starting material.

(ii) Layer thickness is easily modulated to maximize absorption efficiency and minimize resistance.

(iii) Fabrication may be compatible with other chalcogenic materials and compound semiconductors producing a wide range of known and presently still unknown new materials and geometries. Prior to this invention, semiconductor materials (e.g. silicon) were made using high energy processes to produce doped crystalline material. This invention realizes single crystal synthesis, doping and structuring in a simultaneous, spontaneous, low energy process. The result is an orders-of-magnitude savings in terms of energy budget and starting materials and processing costs.

(iv) The morphology of the resulting material relies solely on the unique physiochemical properties of an interface between two phases and the properties of the precursor, the crystalline product and the solvent, as well as on the temperature, to direct the crystal growth of the resulting material. There is no need for the addition of an external template to direct the crystal growth.

(v) Surface patterning of the material is a spontaneous process and therefore consumes no energy. In some instances the crystals are aligned orthogonal to a common backplane. This creates a nanostructured surface which has a high surface area and a low reflectivity (with high utility for photovoltaic, catalytic and electrical battery applications).

An aspect of the invention is a method for producing a nanomaterial comprising producing the nanomaterial utilizing low-temperature solution-based chemistry.

Another aspect of the invention is a method for producing a nanomaterial comprising producing the nanomaterial utilizing low-temperature solution-based chemistry without the use of biological or biochemical templates and wherein the nanomaterial is free of organic contaminants.

According to an aspect of the invention, a method for synthesizing thin films and materials comprises providing a molecular precursor, dissolving the precursor in a solvent and forming a solution, placing the solution in a closed environment at low temperature, and introducing a catalyst into the closed environment, wherein a reaction occurs between the precursor and the catalyst, wherein crystalline growth occurs as result of the reaction, and wherein the crystalline growth forms a thin film at the surface of the solution.

In one embodiment, the thin film or material is selected from the group consisting of: a metal oxide, a metalloid oxide, an organometallic oxide, or an organometalloid oxide.

In another embodiment, the thin film or material is selected from the group consisting of: a metal hydroxide, a metalloid hydroxide, an organometallic hydroxide, or an organometalloid hydroxide.

In another embodiment, the thin film or material is selected from the group consisting of: a metal phosphate, a metalloid phosphate, an organometallic phosphate, or an organometalloid phosphate.

In one embodiment, the precursor comprises a precursor of a chalcogen or mixture of chalcogens. In another embodiment, the solvent comprises a high dielectric solvent. In a further embodiment, the closed environment comprises an air or inert gas environment. In yet another embodiment, the precursor comprises a hydrolyzable molecular complex of a material selected from the group consisting of: metals, metalloids, organometallics, or organometalloids.

According to another aspect of the invention, the thin film is removed using Langmuir-Blodgett processing. Another aspect of the invention is to dry the thin film.

In one embodiment of the invention, the catalyst is introduced as a diffusible small molecule. In another embodiment, ammonia vapor diffuses through the gas phase, and dissolves at the gas-liquid interface.

In another embodiment of the invention, the catalyst is introduced as a sublimable solid.

In another embodiment of the invention, the catalyst comprises a volatile catalyst of hydrolysis. In this embodiment, the catalyst may be selected from the group consisting of ammonia, water, cysteamine, volatile organic acids, volatile inorganic acids, volatile organic bases, and volatile inorganic bases.

In another embodiment of the invention, the thin film or material is subsequently heated to produce an oxide form of the thin film or material, without loss of morphology.

In another embodiment of the invention, the thin film or material comprises a phosphate material.

In another embodiment of the invention, the thin film or material comprises single-crystal planes of p-type semiconductor connected to an electronically conductive flat backplane.

In another embodiment of the invention, the thin film or material is titanium dioxide.

A further aspect of the invention is to control the vectorial gradient of catalyst in both space and time. In one mode, this is carried out by controlling vapor diffusion and solubilization at the gas-liquid interface. In another mode, the vectorial gradient is controlled using a solid-phase enzyme or other catalytic surface wherein the surface acts simultaneously as a catalyst and as a template or scaffold for the growth of the inorganic.

In one embodiment of the invention, the molecular precursor is ionic. In another embodiment of the invention, the molecular precursor and the catalyst are soluble in the solvent.

In one embodiment, the low temperature environment described above comprises a temperature that is substantially room temperature.

According to another aspect of the invention, a method for producing a nanomaterial comprises providing a molecular precursor, dissolving the precursor in a solvent and forming a solution, coating a substrate with the solution and forming a coated substrate, placing the coated substrate in a closed environment at low temperature, and introducing a catalyst into the closed environment, wherein a reaction occurs between the precursor and the catalyst, wherein crystalline growth occurs as result of the reaction, and wherein the crystalline growth forms a thin film or material at the surface of the solution on the substrate.

In one embodiment, the substrate is selected from the group consisting of: glass, silicon oxide, gold, platinum, steel, indium tin oxide, fluorine-doped tin oxide, fibrous cellulose, and fibrous nylon.

Another aspect of the invention is cobalt hydroxide or a cobalt hydroxide based material. In one embodiment, the cobalt hydroxide based material comprises alternating layers of thin crystal sheets of cobalt hydroxide held together by electrostatic coordination with "interlayers" of dopant ions. In one embodiment, the cobalt hydroxide based material comprises single-crystal plates of p-type semiconductor connected to an electronically conductive flat backplane. In one embodiment, the material is adapted for incorporation in p-n junction devices for photovoltaic and other semiconductor applications. In another embodiment, the material has a very high dopant density and absorbs light intensely in the visible part of the spectrum.

An aspect of the invention also comprises a material and method of fabricating the material wherein the material comprises a semiconducting, photoconductive, photovoltaic, optoelectronic, battery or other material having a crystalline structure with nanoscale order.

An aspect of the invention is a material having a crystalline structure with nanoscale order.

Another aspect of the invention is a material having a crystalline structure with nanoscale order fabricated utilizing low-temperature solution-based chemistry. In one embodiment of this aspect, low temperature comprises a temperature that is substantially room temperature.

Another aspect of the invention comprises a material and method of fabricating the material wherein the material comprises cobalt hydroxide, a cobalt hydroxide based material, a titanium dioxide based material, a tin oxide based material, an indium tin oxide based material, a zinc oxide based material, or other oxide based material including, but not limited to, a metal oxide, a metalloid oxide, an organometallic oxide or an organometalloid oxide.

Yet another aspect of the invention comprises a thin film or material that comprises single-crystal plates of p-type semiconductor connected to an electronically conductive flat backplane. In one embodiment, the thin film or material is hydroxide based. In another embodiment, the thin film or material is oxide based. In one embodiment, the thin film or material is hydroxide based. In another embodiment, the thin film or material is oxide based. In one embodiment, the thin film or material is phosphate based. In another embodiment, the thin film or material is oxide based. In one embodiment, the thin film or material is nitride based.

Still another aspect of the invention is a method of producing nanocrystalline perovskite materials, comprising: producing nanocrystalline perovskite materials utilizing low temperature solution-based chemistry in the absence of a structure-directing template; wherein the nanocrystalline perovskite materials are well-defined and on the order of approximately 6 nm.

Yet another aspect of the invention is a thin film or material fabricated according to any of these methods, wherein the thin film or material acts as a conductor at low temperatures, but changes to an insulator at higher temperatures.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 5A is a high resolution XPS spectrum for the Co 2p region for the three $\alpha$-Co(OH)$_2$ films.

FIG. 5B is a high resolution XPS spectrum for the Cl 2p, N1 s, and S 2p regions for the three $\alpha$-Co(OH)$_2$ films.

FIG. 6 is a visible absorption spectrum for the three $\alpha$-Co(OH)$_2$ films, showing absorption maxima.

DETAILED DESCRIPTION OF THE INVENTION

Referring more specifically to the drawings, for illustrative purposes the present invention is embodied in the product and method generally shown in FIG. 1 through FIG. 20. It will be appreciated that the product may vary as to configuration and as to details, and that the method may vary as to the specific steps and sequence, without departing from the basic concepts as disclosed herein.

1. Basic Method

Figure 1:
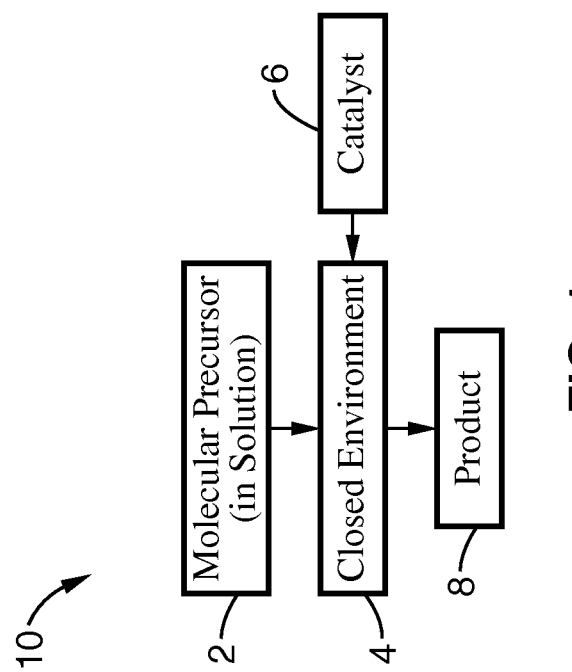
FIG. 1 is a block diagram of the process according to the present invention.

An overview of the process 10 is shown in FIG. 1. An ionic precursor 2 or mixture of precursors of a chalcogen or chalcogens (such as metal oxides, sulfides, etc.) is first dissolved in a high dielectric solvent; this precursor solution can be made over a wide range of starting concentrations to yield a range of desired final compositions, thicknesses and surface morphologies. The starting material is a soluble precursor that upon hydrolysis will yield a metallic chalcogen, organometallic chalcogen, or mixture of such compounds. The starting material (precursor) solution is enclosed in a closed environment 4, such as an airtight container with an atmosphere of either air or an inert gas. In the same container is added the catalyst of hydrolysis 6 which can be either in a separate solution or be composed of a high vapor pressure solid. The catalyst can be any volatile catalyst of electrolysis, such as ammonia, water, cysteamine, volatile organic acids, volatile inorganic acids, volatile inorganic acids, or volatile inorganic bases. Upon enclosing these two components in an air-tight container the catalyst diffuses into the starting material solution, resulting in a product 8, which is a semiconducting and/or optoelectronically active sheet of material for use in electronic, photovoltaic or optoelectronic devices.

Figure 2B:
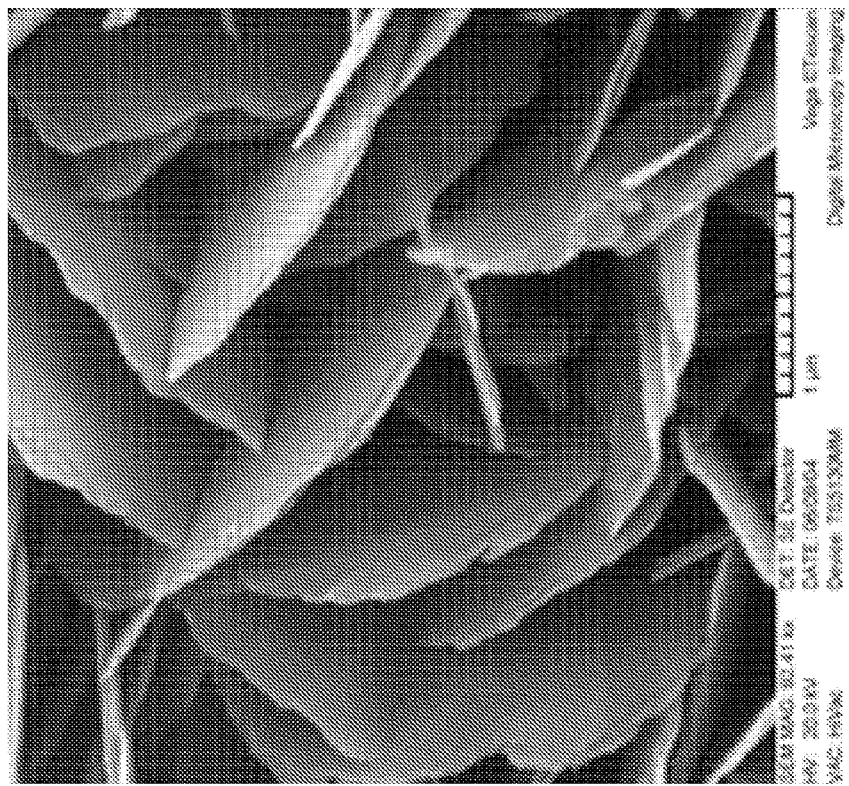
FIGS. 2A and 2B are SEM images of a cobalt hydroxide thin film produced according to the present invention.
Figure 2A:
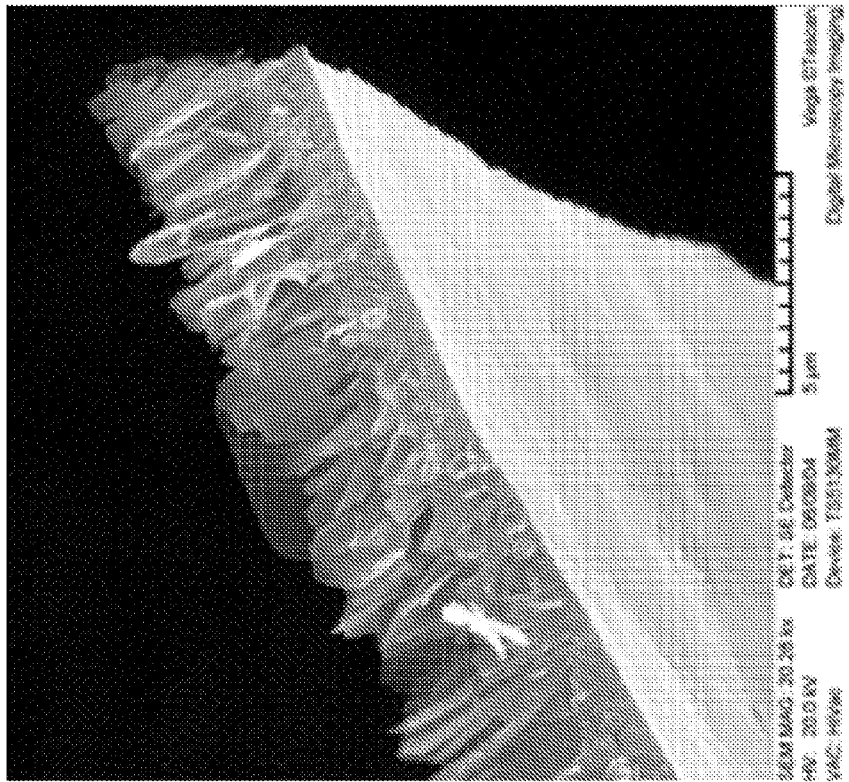
Figure 3A:
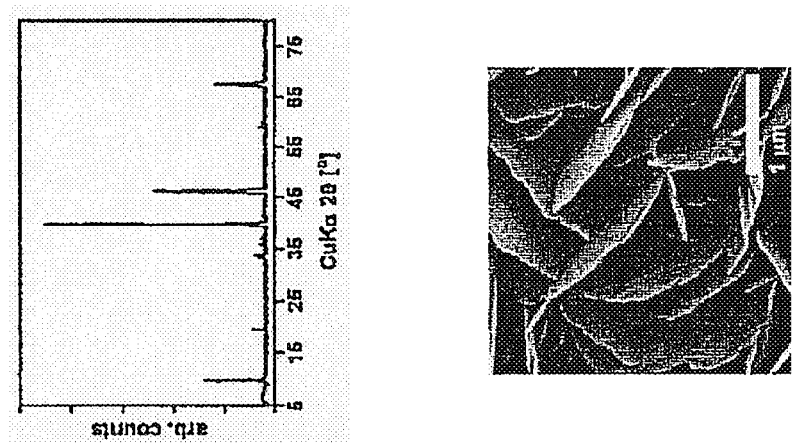
FIGS. 3A-3D are SEM images of metal hydroxide and phosphate thin films.
Figure 3A:
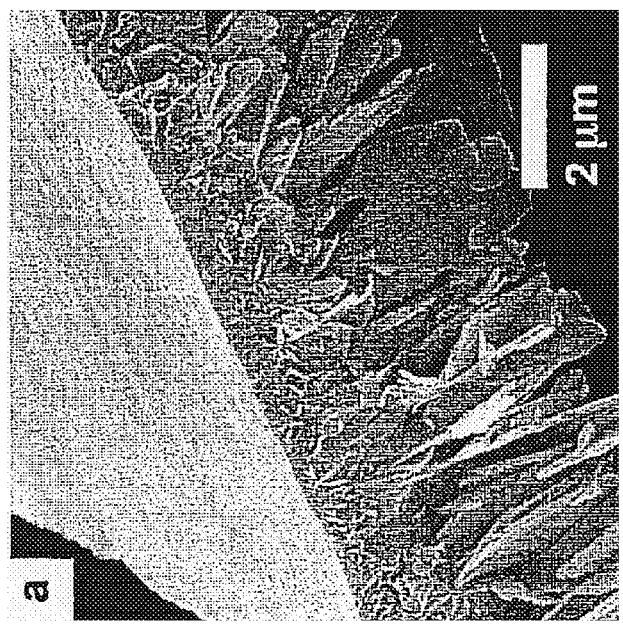
Figure 3B:
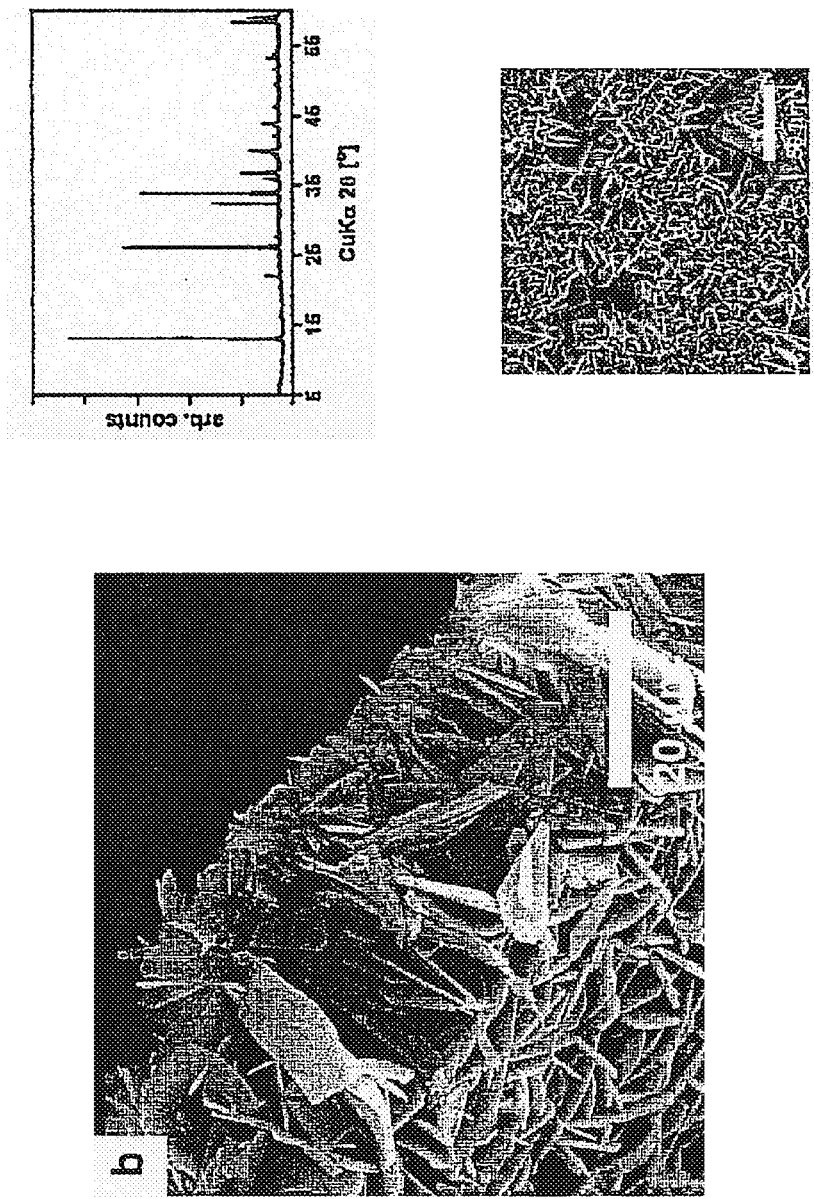
Figure 3C:
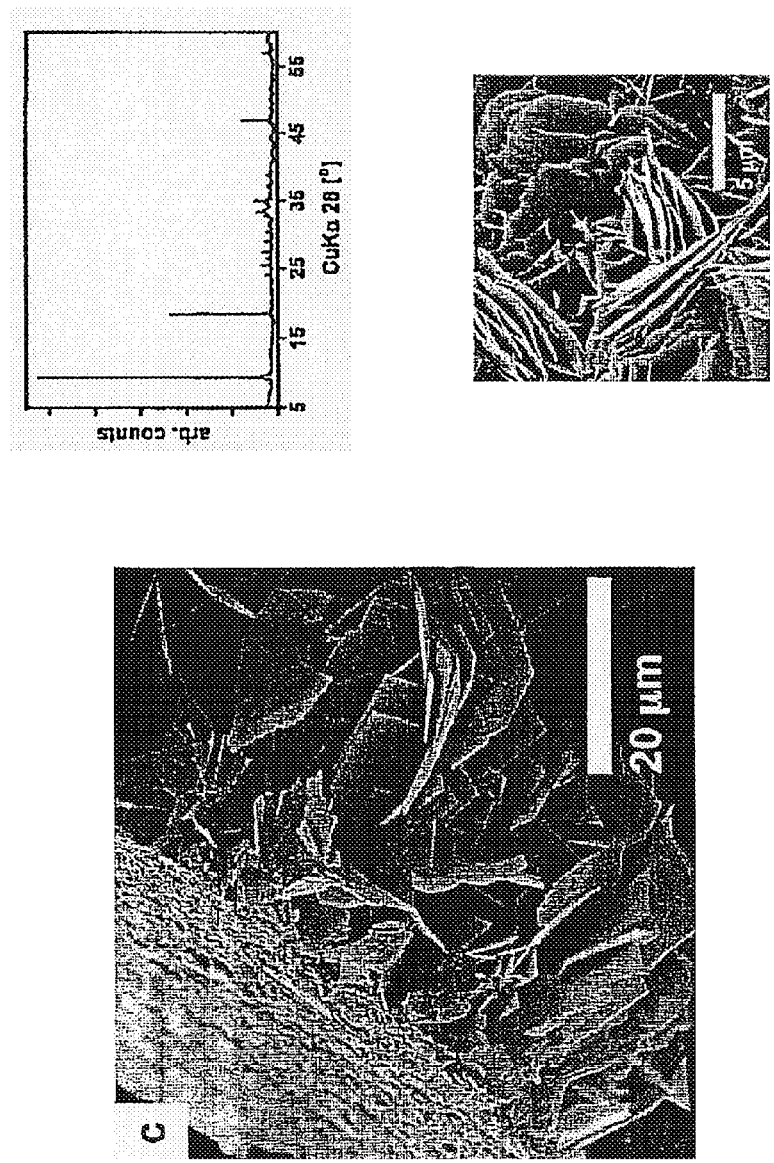
Figure 3D:
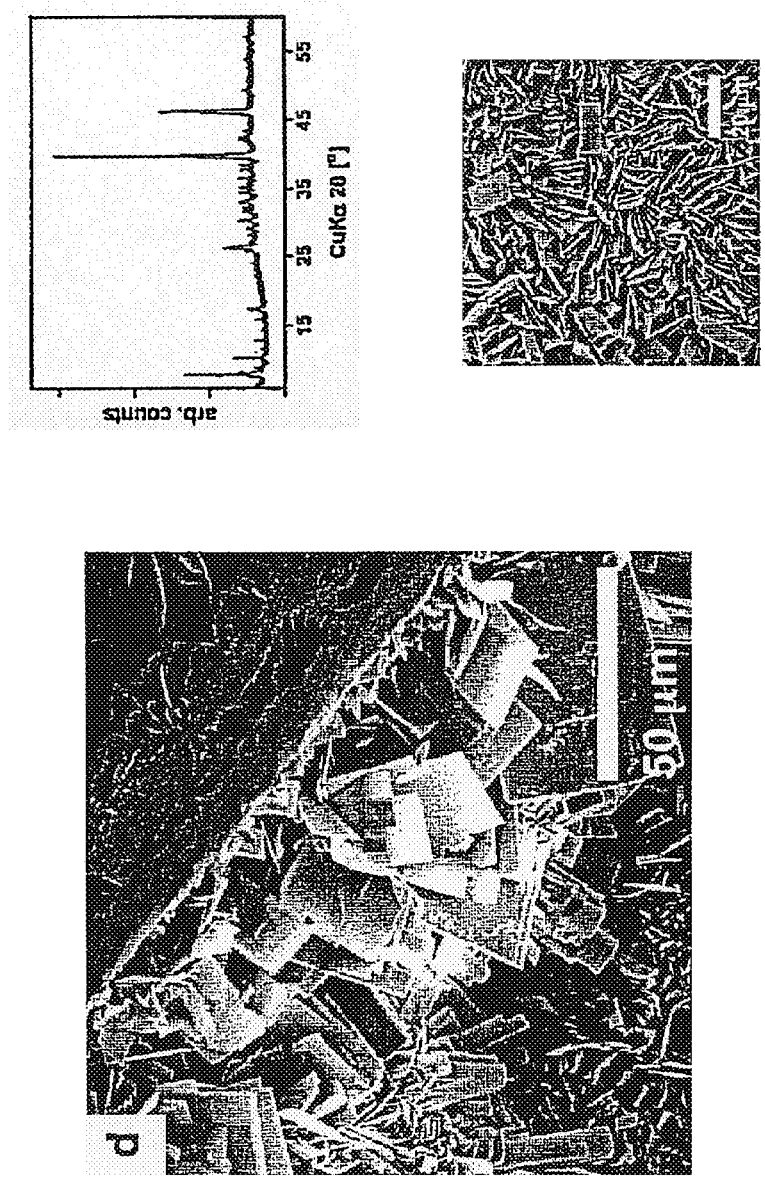

Referring to FIGS. 2A and 2B, an SEM image of a cobalt hydroxide product according to the present invention is shown.

The catalytic hydrolysis of the precursor(s) occurs at the interface between the liquid and gas phases. The interface acts as a template for the growth of the resulting crystal nuclei and the complex physiochemical properties of the interface govern the composition, phase and morphology of the resulting material. The resulting thin film is easily transferred using a Langmuir-Blodgett process to any substrate of interest (e.g. metal, silicon, GaAs, etc.). Variation in reaction time, temperature, precursor compositions and concentrations yields films with a range of compositions, physical properties and thicknesses from 0.2-200 μm.

In an effort to overcome the above-identified disadvantage of the protein-catalyzed and templated silicatein process, the catalytic elements of the protein have been identified and successfully mimicked with block-copolypeptides, bifunctional small molecules, and nanoparticle-supported self-assembled monolayers that function at low-temperature and neutral pH.

Thus, a novel, biologically inspired and kinetically controlled vapor-diffusion synthesis of inorganic thin films has been developed, based on the translation of the following principles learned from the silicatein mediated syntheses described above:

a) Slow catalysis of synthesis from molecular precursors provides the opportunity for kinetic control; and b) Crystal growth is vectorially regulated by a template, operating in concert with kinetic control to provide spatial and temporal control of crystal polymorph, orientation and morphology.

The catalyst preferably should exhibit a vapor pressure that supports gas phase transport to the surface of the precursor solution. An appreciable solubility of the gaseous catalyst in the precursor solution will facilitate the product-forming reaction, but may not be necessary in some cases. In fact, gas phase catalysts that are insoluble may provide avenues to as yet unspecified morphologies and physical properties of the product materials.

The essence of this invention is the resulting formation of a material at the interface between the liquid phase starting material (precursor solution) and the vapor phase catalyst. The resulting nanoscale crystallographic architecture, overall morphology and properties of the resulting product(s) will be controlled by the kinetically controlled rate of hydrolysis of the precursor(s) and the directionally controlled crystallographic growth of the resulting chalcogenic material(s).

To mimic the slow catalysis and anisotropic, vectorial control of crystal growth mediated by silicatein, a low-temperature, solution-base method employing the slow diffusion of ammonia vapor as a catalyst for hydrolysis of metal-containing molecular precursors was developed. This diffusion through a solution of molecular precursor establishes a spatially and temporally regulated gradient of the catalyst, while the vapor-liquid interface serves as a nucleation template. The resulting vectorially controlled combination of the molecular precursor and hydrolysis catalyst at room temperature yields a nanostructured thin film at the vapor-liquid interface, formed as the gaseous catalyst dissolves in an aqueous metal salt solution to initiate hydrolysis. The diffusion of the basic catalyst (ammonia) into the aqueous solution creates a pH gradient that determines the morphology of the growing film, resulting in a unique structure of the film. Unlike previous approaches, this biologically inspired low-temperature synthesis route employs no organic reagents or substrate. The elimination of possible carbon contamination of the films leads to device-quality materials.

This approach proves widely applicable for growth of relatively large area (2 cm$^2$) thin films suitable for structural and electronic characterization of the material and holds the potential of growing even larger films for device applications.

EXAMPLE

All starting materials used in this study were commercially available and used without further purification. A dilute solution of $NH_4OH$ and separate solutions of either aqueous 0.1 M $CoCl_2$, 0.1 M $Co(NO_3)_2$, 0.1 M $CoSO_4$, 0.1 M $Zn(NO_3)_2$ or 0.1 M $Cu(NO_3)_2$ were placed in the same enclosed chamber. For the preparation of $Mn_3(PO_4)_2 \cdot 7H_2O$, 0.058 g of $(NH_4)_2HPO_4$ (0.5 equiv.) was added to 4 ml of 0.1 M $MnCl_2$ solution. This mixture then was exposed to ammonia vapor from a dilute solution of $NH_4OH$. The synthesis of metal hydroxide and phosphate thin films occurred at room temperature and ambient pressure over the course of 18 hours. After formation, the films were transferred onto a doubly distilled water surface to remove traces of starting material solution, using a Langmuir-Blodgett technique.

Scanning electron microscopy (SEM) was performed on dried samples using a Tescan Vega 5130 SEM. Powder X-ray diffraction (XRD) was performed using a Bruker D8 diffractometer with monochromatic Cu K$\alpha$ radiation ($\lambda$=1.540 Å). To confirm elemental composition, X-ray photoelectron spectroscopy (XPS) was performed using a Kratos Axis Ultra with a monochromated aluminum anode. Binding energy of C 1 s in all spectra was shifted to 285 eV. X-ray Absorption Near Edge Spectroscopy (XANES); Co-K-edge EXAFS spectra were collected at the Stanford Synchrotron Radiation Laboratory (SSRL) beam line 11-2 under SPEAR3. Samples were diluted to 10 wt % in boronitride (BN) and placed in a plastic (PCTFE) sample holder using Kapton tape as the window material. X-ray energy was selected using a Si(220) double-crystal monochromator, detuned 50% for harmonic rejection. Energy was calibrated by defining the first derivative peak of a Mn metal foil to be 6540 eV. Inductively coupled plasma atomic emission spectroscopy (ICP-AES) was performed using a TJA High Resolution IRIS ICP Atomic Emission Spectrometer. Solutions of $CoCl_2$, $Co(NO_3)_2$ and $CoSO_4$, respectively, in 2% $HNO_3$ containing 60 PPM Co were used as the respective standards for calibration of the ICP measurements. Transmission electron microscopy (TEM) was performed using a Tecnai T20 and electron diffraction patterns were acquired at a camera length of 650 mm. UV/Vis spectra of samples dried on glass slides were taken with a Molecular probes UV/Vis spectrometer with 2 nm resolution.

Continuous sheets of product were transferred to a platinum interdigitated array of electrodes (IDE) with a width and spacing of 5 µm. The material on the electrode was dried at room temperature under vacuum (762 mm Hg) for 12 hours. The IDE was connected to a Keithley 4200 SCS testing system for IV and photoconduction analyses. For IV analysis the voltage was ramped from −0.75 to 0.75 V while monitoring the current passing through the device. Photoconductivity was observed by applying 2.5 V of bias while continuously monitoring the current through the device in the dark. The device was then exposed to 2 s visible light pulses using a fiber optic light source (Ehrenreich Ind., Garden City, N.Y.) to minimize the amount of sample heating. The light source provided an average intensity of $80 \times 10^3$ lux with a spectral range of 400-1400 nm.

Results and Discussion

The described kinetically controlled vapor-diffusion synthesis route has been used to prepare metal hydroxide films from aqueous $CoCl_2$, $Co(NO_3)_2$ and $CoSO_4$, $Zn(NO_3)_2$ and $Cu(NO_3)_2$ solutions, as well as metal phosphate derivatives (e.g. $Mn_3(PO_4)_2 \cdot 7H_2O$) from the appropriate precursors. Surface tension at the air-water interface and the induced pH-gradient provide a template that directs the growing materials to adopt continuous sheet morphology. Scanning electron microscopy images of the resulting hydroxide and phosphate films are shown in FIGS. 3A-3D.

All of these materials show similar morphologies: a continuous backplane parallel to the air-water interface with plates that grow orthogonally from the backplane into the aqueous solution. This unique morphology of macroscopic and microscopic organization of the material was previously reported in one previous study of $Co(OH)_2$ films. The method in that study, however, involving growth on glass substrates with urea and methanol as reagents, yielded material with a composition of $Co(OH)_{0.93}(NO_3)_{0.03}(CO_3)_{0.52} \cdot 0.27H_2O$, which revealed the stoichiometri incorporation of carbon. This is in marked contrast to the results of the instant method. No organic reagents or solvents were used to prepare the inorganic thin films displayed in FIGS. 3A-3D.

Kinetic studies of the syntheses reported herein revealed that after initial island nucleation and during consolidation of the crystalline film at the gas-liquid interface, crystalline plates of the same material grow orthogonally into the starting solution from one common backplane which is parallel to the vapor-liquid interface (FIGS. 3A-3D). The density, size and shape of these orthogonal plates, as well as the size of the crystalline domains, depend on the choice of the metal salt precursor and the reaction time.

During the reaction, very large area films can be produced. Depending on the shape and volume of the reaction vessel, continuous films of ~50 cm$^2$ have been produced. The inorganic films, however, crack during the drying process and the largest continuous film used for electronic characterization thus far was ~2 cm$^2$.

$Co(OH)_2$ is used as an additive in numerous industrial processes and has application potential as an oil additive or in alkaline secondary batteries and displays interesting magnetic properties. It exists in two common phases: $\alpha$-$Co(OH)_2$ and $\beta$-$Co(OH)_2$. $\beta$-$Co(OH)_2$ is commercially available and pink in color. It crystallizes in hexagonal layers in which divalent cobalt ions are octahedrally coordinated and surrounded by six oxygen atoms of the hydroxyl groups. The individual layers are held together in an ordered array by hydrogen interaction, resulting in the so-called brucite structure.

The literature suggests that $\alpha$-$Co(OH)_2$ is a molecular composite of cobalt-containing crystalline layers, rather than a single defined compound.

These layers have a net positive charge and are held together by incorporated counter ions. The net positive charge of the individual layers has been attributed to a hydroxyl deficiency within the cobalt-containing sheets of $Co(OH)_2$ which in some cases is explained by the presence of mixed valent octahedrally coordinated cobalt ions (2+ and 3+) in those layers. The mineral hydrotalcite ($Mg_6Al_2(CO_3)(OH)_{16}.4H_2O$) displays a similar layered crystal structure in which sheets with mixed valent metal ions (2+, 3+) are coordinated octahedrally and the positively charged sheets are held together by counter anions ($CO_3^{2-}$). Therefore, the $\alpha$-$Co(OH)_2$ structure is often referred to as a hydrotalcite-like structure. At least one researcher, however, showed in a study involving X-ray absorption near edge structure (XANES) that for $Co_2(OH)_3(NO_3)$, $Co_5(OH)_8(C_7H_{15}CO_2)_2.4H_2O$, and $Co_5(OH)_8(C_2N_3)_2.6H_2O$, the positive charge of the $Co(OH)_2$ sheets results from the incorporation of tetrahedrally coordinated $Co^{2+}$ ions into the crystal structure. In a related system, $Zn_5(NO_3)_2(OH)_8.2H_2O$ crystallizes in a hydrotalcite-like structure in which the net positive charge of the $Zn^{2+}$ containing sheets results from the incorporation of tetrahedrally coordinated ions into the crystal structure of otherwise octahedrally coordinated ions.

$\alpha$-$Co(OH)_2$ films were prepared from three different precursor solutions: $CoCl_2$ (I), $Co(NO_3)_2$ (II) and $CoSO_4$ (III) using the method of the present invention. Films prepared from these three precursor solutions show similar morphologies. In all cases the plates on the roughened side of the thin film (FIGS. 3A-3D) are approximately 50 nm thick, 3-5 µm tall, depending on the reaction time, and randomly oriented perpendicular to a 1 µm thick backplane.

Powder XRD patterns of the ground films (FIGS. 4A-4C) indicate a monoclinic crystal structure (C2/m) for all three $\alpha$-$Co(OH)_2$ products (I, II, III). This is in agreement with previous findings for $Zn_5(OH)_8(NO_3)_2.2H_2O$ and also with the work on layered $\alpha$-$Co(OH)_2$ compounds.

Well resolved (001) and (002) reflections in the XRD patterns (FIGS. 4A-4C) demonstrate an increased interlayer spacing along the c-axis of the crystal structure in comparison to $\beta$-$Co(OH)_2$ (c=4.6 Å). The lattice parameter value in the c-direction for $Co_5(NO_3)_2(OH)_8.2H_2O$ (II, $c_{II}$=9.19 Å) is in good agreement with previous reports (c=8.4 Å) of $\alpha$-$Co(OH)_2$ thin films prepared with nitrate incorporation between the $Co^{2+}$ containing layers.

A progressive increase of the interlayer spacings with increasing anion size is observed in the order $Cl^-$ ($c_I$=8.12 Å)<$NO_3^-$ ($c_{II}$=9.19 Å)<$SO_4^{2-}$ ($c_{III}$=11.26 Å). While this trend has been reported before for anion incorporation into $\alpha$-$Co(OH)_2$ powder, the c-axis lattice spacings they report are up to ~13% smaller. However, not too much should be interpreted from this difference, since this study analyzed less crystalline materials with a different water content than reported here.

As expected, 2-D reflections [(10/) and (11/)] in the XRD pattern (FIGS. 4A-4C) agree with the lattice parameters of $\beta$-$Co(OH)_2$ and do not shift with changes in interplanar lattice spacings as they contain no c-axis component. Reflections corresponding to (111) and (011) show small shifts in d-spacing with respect to $\beta$-$Co(OH)_2$, again consistent with the larger c-axis dimension. The crystalline correlation lengths of the three $\alpha$-$Co(OH)_2$ materials were calculated using the Scherrer formula. The crystalline correlation length was largest for II (441 Å), followed by compounds I (350 Å) and III (185 Å).

Figure 4A:
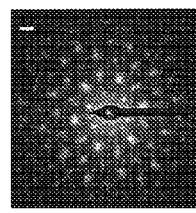
FIGS. 4A-4C are powder XRD and electron diffraction patterns for the three $\alpha$-Co(OH)$_2$ films.
Figure 4A:
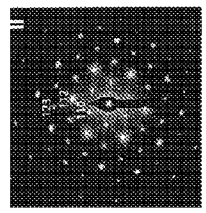
Figure 4A:
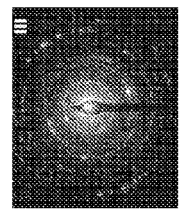
Figure 4A:
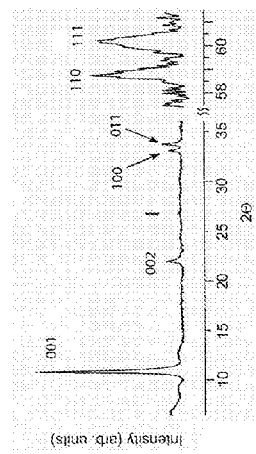
Figure 4B:
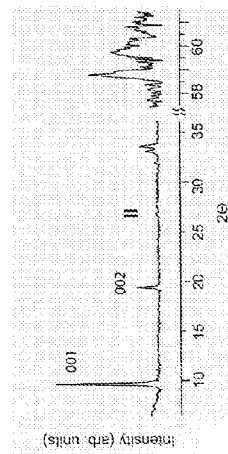
Figure 4C:
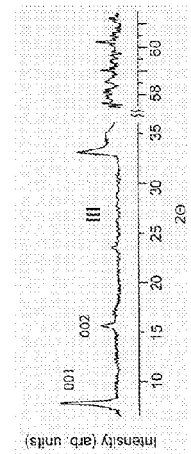

The electron diffraction (ED) patterns in FIGS. 4A-4C mirror the respective crystalline correlation lengths calculated from the XRD data, showing large crystals for II and decreasing crystallite size in I and III. Slight imperfections and possible double diffraction are observed for I and higher polycrystallinity is observed for III. Narrow line widths in the XRD and single crystal ED patterns of II suggest that each layer is in aligned with neighboring layers and not randomly oriented around the c-axis. The polycrystallinity of I may be due to the stacking order of the cobalt-containing sheets being parallel and equidistant but rotationally translated with respect to each other. The sulfate-containing material is the most defective of the three, resulting in the observation of polycrystalline rings in the ED. Single crystal diffraction patterns were observed for II down the (01-1) zone axis, with d-spacings corresponding to the lattice planes (110), (112), and (123) (a=3.13 Å; c=9.19 Å). The calculated unit cell parameters for I, II, and III are $a_{I,II,III}$=3.14 Å; $c_I$=8.12 Å; $c_{II}$=9.19 Å; and $c_{III}$=11.26 Å, which are in perfect agreement with the XRD data. Unit cell dimensions obtained by the two techniques are thus identical, indicating that the material is homogeneous on the crystalline and bulk length scales.

The XRD and electron diffraction data agree with one another and indicate that the material is structurally similar to $Zn_5(OH)_8(NO_3)_2.2H_2O$. This latter material is known to consist of layered sheets with octahedrally coordinated Zn ions in the brucite layer, one fourth of which are replaced by two tetrahedrally coordinated Zn ions located above and below the plane of the octahedrally coordinated Zn ions. This structure thus exhibits an overall ratio of 3:2 octahedral to tetrahedral sites and a charged cation layer. The same crystal structure has been previously proposed for $Co_2(OH)_3(NO_3)$, $Co_5(OH)_8(O_2CC_6H_4CO_2).2H_2O$, $Co_4(OH)_2(O_2CC_6H_4CO_2)_3.(NH_3)_{1.5}(H_2O)_{2.5}$ and $Co_5(OH)_8(NO_3)_2.2H_2O$. More recently, another $\alpha$-$Co(OH)_2$, $Co_7(OH)_{12}(C_2H_4S_2O_6)(H_2O)_2$, was synthesized, in which one-sixth of the octahedrally coordinated $Co^{2+}$ ions are replaced by two tetrahedral sites.

The compositions of the $\alpha$-$Co(OH)_2$ films I, II and III were analysed using ICP-AES and C, H, N-analysis. Based on these results, compound I is proposed to be $Co_5(OH)_8Cl_2.3H_2O$ (anal. found: H, 2.70%; Co, 52.9%; calc: H, 2.54%; Co, 53.0%). Compound II was found to have the composition known from the literature as $Co_5(OH)_8(NO_3)_2.2H_2O$ (anal. found: H, 2.51%; N, 4.73%; Co, 52.7%; calc: H, 2.05%; N, 4.74%; Co 49.9%), and is a direct analog of $Zn_5(OH)_8(NO_3)_2 \cdot 2H_2O$. ICP-AES analysis of III gave a Co:S ratio of 5:1 and analyses are consistent with a formula of $Co_5(OH)_8SO_4 \cdot 2H_2O$ (anal. found: H, 2.29%; S, 5.91%; Co 51.8%; calc: H, 2.15%; S, 5.70%; Co 52.4%). X-ray photoelectron spectroscopy (XPS) data indicate the presence of $Co^{2+}$ with the 2p peak centred at 780.6 eV (FIG. 5A) in all three materials. The peak position and shape are consistent with literature values reported for $Co(OH)_2$. These data restrict the potential presence of $Co^{3+}$ centers to a few mole percent. The O 1 s peaks for all materials have a maximum intensity component centered at 530.8 eV (data not shown). This also is in good agreement with previously reported data for $\beta$-$Co(OH)_2$. In FIG. 5B, the Cl 2p peak of compound I is centered at 198.2 eV, indicative of the Cl⁻ anion (Cl $2p_{cl}$=198-200). The nitrogen 1 s peak position (407.0 eV) of material II is congruent with the reference spectrum for nitrate (N 1 $s_{NO3}$=407-408 eV) and also the S 2p peak in III, centered at 168.2 eV, is in agreement with the literature for $SO_4^{2-}$ anions (S $2p_{SO_4}$=168-171 eV). All binding energy values are within the energy range of the corresponding reference spectra.

The $Co_5(OH)_8Cl_2 \cdot 3H_2O$ (I), $Co_5(OH)_8(NO_3)_2 \cdot 2H_2O$ (II) and $Co_5(OH)_8SO_4 \cdot 2H_2O$ (III) films are dark green in color, with visible absorption (UV/Vis) spectra showing strong peaks near 660 and 600 nm for all materials (FIG. 6). Compound I absorbs at slightly longer wavelengths compared to II, while the spectrum of III is marginally blueshifted. Absorption above ~600 nm in the visible spectrum is indicative of tetrahedral $Co^{2+}$ centers. Possible features (weak d-d transitions) below 600 nm, indicating octahedral $Co^{2+}$ centers, are obscured by the diffuse reflectance of the samples or hidden under the intense bands which have been assigned to the $^4A_2 \rightarrow ^4T_1(P)$ transition of the tetrahedral $Co^{2+}$. The splitting is due to spin-orbit coupling. In contrast, $\beta$-$Co(OH)_2$, with symmetric octahedral bonding geometry around the cobalt center, is pink in color ($\lambda_{max}$=470 nm).

These UV/Vis observations provide strong confirmation that our materials indeed contain tetrahedrally coordinated $Co^{2+}$ ions. No bands indicating the presence of $Co^{3+}$ ions could be seen. In combination with the XPS data, this conclusion supports the suggestion that the positive net charge in these $\alpha$-$Co(OH)_2$ materials indeed originates from differently coordinated metal ions, as described above, instead of mixed valent ions.

X-ray Absorption Near Edge Structure (XANES) was recorded for $Co_5(NO_3)_2(OH)_8 \cdot 2H_2O$ (II). The K-edge energy is 7719 eV, which is in agreement with reported values for Co(II) reference compounds. A weak pre-edge feature is observed at 7709 eV. This pre-edge feature results from a lack of inversion symmetry in crystal sites due to the presence of tetrahedral coordination of some of the cobalt ions present in the material, supporting the above conclusions.

Methods used previously to make $\alpha$-$Co(OH)_2$ materials involved electrochemical, chemical, and sonication assisted synthesis routes, but direct electronic measurements previously could not be carried out on the resulting materials because of the low quality powder morphology, low crystallinity and the absence of suitable thin films. Few publications report the growth of $Co(OH)_2$ thin films on substrates. In most cases the material described was either $\beta$-$Co(OH)_2$ or an extremely amorphous material, with the exception of one thin film study. $\alpha$-$Co(OH)_2$ has been investigated primarily in nanocrystalline morphology. In contrast, the continuous morphology of the films reported here makes such direct electronic measurements possible for the first time.

The continuous morphology and high degree of crystallinity of $Co_5(NO_3)_2(OH)_8 \cdot 2H_2O$ (II) made this the material the best choice for further electronic characterization. Ohmic contact with a metallic conductor was readily achieved with physical contact between II and a platinum interdigitated micro-electrode without the need for annealing or alloying, as evident in the observed linear response to voltage in the IV curve (data not shown). The IV characteristics were measured parallel to the plane of the material and the dark sheet resistance was observed to be ~100 $\Omega$cm. A high anion density within the material, resulting from the interlayer incorporation of anions into the crystal structure, is consistent with the observed resistivity assuming that the contact resistance is small with respect to the bulk material resistance.

The photoconductive properties of II were measured, in view of the unique electronic environment around the cobalt centers created by the mixture of octahedrally and tetrahedrally coordinated ions in close proximity. The material is expected to behave as a p-type semiconductor because of the additional positive charge induced in the cobalt-containing layers by the replacement of one octahedral $Co^{2+}$ site with two tetrahedral $Co^{2+}$ sites in the crystal lattice. P-type semiconductors exhibit an increase in conductivity when irradiated with light of sufficient energy to excite charge carriers in the material [34]. Light of energy greater than the material's band gap ($E_g$) generates an equal number of electrons and holes. In a p-type material, this results in a large increase in concentration of minority carriers (i.e. electrons), thereby changing the conductivity of the material. The absorption spectrum indicates that the material absorbs strongly in the visible range, and therefore should be photoactive in this range.

Figure 7:
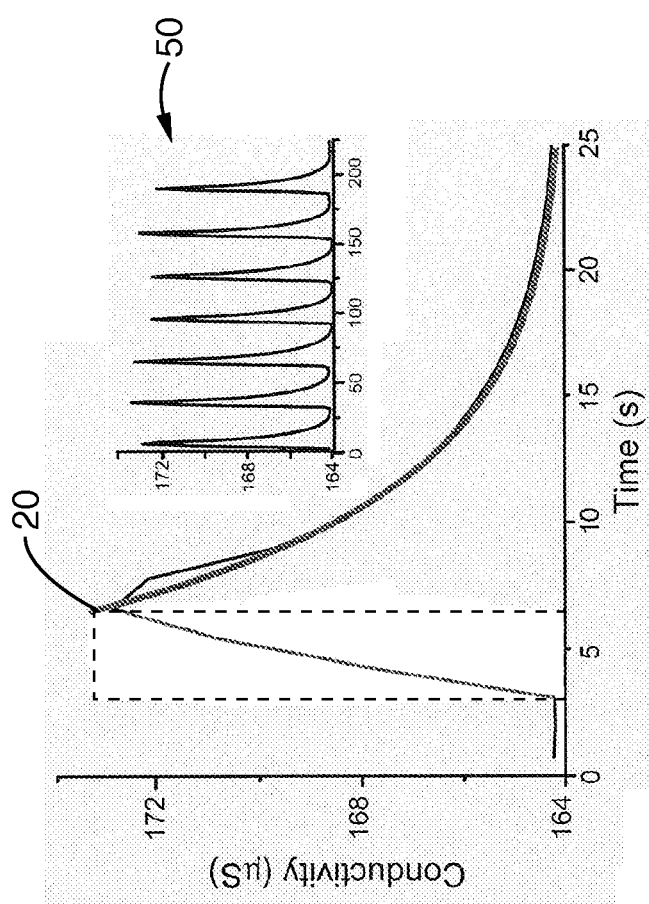
FIG. 7 is a depiction of the photoconductive behavior of one of the three $\alpha$-Co(OH)$_2$ films.

Referring to FIG. 7, conductivity of the material increases sharply when exposed to visible light as a result of the increase in minority carriers. After the light is turned off, the minority carrier concentration decreases as exp $(-t/\tau)$, where $\tau$ is the minority carrier lifetime. The observed decay curve is fit to a single exponential function 20 (FIG. 7) with $\tau$=4.8 s and $R^2$=0.991. This high quality fit to a single exponential function is an indication that one process dominates the decay of the conductivity response; it is in good agreement with the above physical characterization indicating relatively defect-free crystallinity. These results suggest that the material behaves as a highly doped p-type semiconductor with a long minority carrier lifetime and a degree of crystallinity sufficient for low resistance conduction. The apparent high doping concentration is most likely a result of the counter anions between the crystalline sheets of $Co(OH)_2$. The unusually long minority carrier lifetime is consistent with the large single crystal domains observed by XRD and ED. In FIG. 7, the inset 50 reflects the reproducibility of the photoconductive response over an extended time course (200 s).

The electron micrographs shown in FIGS. 3A-3D illustrate the unique architecture produced. No other methods previously used have been able to create crystalline cobalt hydroxide-based materials in sizes large enough for their electronic properties to be measured; only powders of minute granules could be made previously.

To tailor the compositions, nanoscale architectures, orientations, overall morphologies and the resulting physical, electronic and optoelectronic properties of the materials produced using this invention, many parameters can be tuned and optimized. These include: the compositions, mixtures, stoichiometries and concentrations of the precursor starting materials (including combinations of a wide variety of metal and organometallic chalcogenic precursors) and of their counterions; the composition, viscosity, surface tension and other properties of the solvent; the composition, reactivity, vapor pressure, solubility and concentration of the catalyst; the nature of the atmosphere inside the closed reaction chamber; the temperature and time of the reaction; programmed time-dependent changes in temperature, compositions, catalyst and viscosity); etc. These readily controlled variables all can be tuned to yield as yet unknown structures and properties beneficial for a variety of potential applications.

In addition, the method of the present invention can be used to apply a coating of material to various substrates, such as glass, silicon oxide, gold, platinum, steel, indium tin oxide, fluorine-doped tin oxide, fibrous cellulose, and fibrous nylon.

It will be appreciated that the fabrication method described herein yields an unprecedented material composition and architecture with a unique set of advantages for photovoltaic, optoelectronic and electronic applications, including (but not limited to) the following:

(i) Low energy room-temperature synthesis spontaneously producing high-quality single crystal sheets of semiconducting material with low resistivity and a high degree of electrical connectivity. The single crystal sheets are oriented in one dimension with respect to a continuous conductive backplane.

(ii) Doping is accomplished by adjusting solution deposition conditions with an almost limitless spectrum of possible dopants.

(iii) Layer thickness is easily modulated to maximize absorption efficiency and minimize resistance.

(iv) Very high surface area for enhanced light collection without the need for a separate structuring process step.

(v) Flat surface on one side allows for good contact with substrate and the material is easily manipulated and can be transferred to a variety of substrates.

(vi) The low cost and high purity of the simple starting materials and conditions of synthesis employed in our method suggest that the resulting material can easily and inexpensively be produced to semiconductor grade quality at low (e.g., room) temperature and pressure.

(vii) The absorption spectrum of the resulting material can be altered by simply changing the counter ion of the starting material.

As can be seen, therefore, high-quality metal oxide semiconductor, photovoltaic and optoelectronic materials can be fabricated with nanometer-scale dimensions and high dopant densities through the use of low-temperature biologically inspired synthesis routes, without the use of any biological or biochemical templates. Advantages include: ready compatibility with CMOS and other semiconductor nanofabrication methodologies; high purity without the need to remove organics and potentially disrupt structures through heating; significantly lower costs than required for silicon-based photovoltaics; high photoconductivity; and strong and tunable absorption in the visible. Materials made by this method can provide one or more components in multi-junction devices for enhanced electronic, optoelectronic and photovoltaic efficiency.

Note also that, while the description above contains many details, these should not be construed as limiting the scope of the invention but as merely providing illustrations of some of the presently preferred embodiments of this invention. It will be appreciated that, in general terms, the inventive method comprises the following steps:

(a) an ionic molecular precursor of a chalcogen or mixture of chalcogens, (b) is dissolved into a high dielectric solvent and (c) placed in closed air or inert gas environment at low temperature, and (d) a volatile catalyst of hydrolysis is introduced into the enclosed environment, (e) wherein a reaction occurs between the precursor and catalyst, resulting in growth of desired crystal nuclei, and (f) resulting crystals create a thin film that is transferred to desired substrate using Langmuir-Blodgett processing.

With regard to the step of introducing the catalyst, it should be note that what was done in this process as described in the example above—but which is not required—is that the catalyst was introduced as a volatile solution; the ammonia vapor diffused through the gas phase and dissolved at the gas-liquid interface. The resulting vectorial gradient of catalyst (vectorial in both space and time) is what generated the unique architecture—and hence, the unique electrical, photoconductive and other physical properties, of the crystalline product. In other words, the crystalline product grew in the form that it did as a result of this novel vectorially controlled addition of the catalyst.

While the vectorial gradient—required for the method—was established here by this trick of vapor diffusion and solubilization at the gas-liquid interface, other methods for establishing such vectorial gradients of catalysis can be used as well. For example, an alternative approach would be the use of solid-phase enzyme or other catalytic surfaces, in which the surface acts simultaneously as a catalyst and as a template or scaffold for the growth of the inorganic.

Note also that the molecular precursor does not have to be ionic in order to practice the invention. What is required is that the molecular precursor and the catalyst be soluble in the solvent used. The specific example provided above cited the use of ionic precursors and high dielectric solvents (such as water). Other examples could include hydrophobic precursors and low dielectric constant solvents.

Additionally, it should be noted that non-chalcogen precursors could be employed although chalcogenic materials encompass a very broad spectrum.

Furthermore, any catalyst of hydrolysis with some solubility in the solvent will work, although the unique architecture and properties of the resulting material will depend in a complex way on the degree of solubility of the catalyst, the rate of its solubilization and diffusion from the gas-liquid interface, and the rates of hydrolysis, crystal nucleation and crystal growth. Catalysts of other classes of chemical reaction, including non-hydrolysis catalysts, would work with other classes of molecular precursors. Other classes of catalysts and precursors may be useful to make other kinds of nanostructure-controlled materials.

Also, while use of the Langmuir-Blodgett process is a preferred step in the overall methodology, it is not the only process that can be used for removal of the structured "film" from the surface of the solvent. Other known methods can be used as well. Additionally, it will be noted that the material should go through a gradual drying step so that the integrity of the nanostructured material is not destroyed through too-rapid degassing of the solvent.

It will further be appreciated that the interplay of providing the kinetic control (i.e., slowing down the supply of crystal-forming constituents through diffusionally controlled catalysis of the hydrolytic breakdown of a molecular precursor), in concert with the vectorial control (cf. discussion above), governs the nanoscale architecture—i.e., the resulting crystal polymorph ("species"), direction of growth (atomic lattice orientation) and morphology.

Using this biologically inspired, kinetically and spatially controlled process, a variety of nanostructured metal hydroxide and metal phosphate thin films have been synthesized at ambient temperature and pressure. Table 1 presents representative products produced using the methods of the present invention. Most of these materials have not been reported in thin film morphology before.

The resulting template-free large area films allow for the first time characterization of films in which the electronic properties and crystal structure are not influenced by the presence of a substrate. The layered hydrotalcite-like $Co_5(NO_3)_2(OH)_8 \cdot 2H_2O$ material produced by this method exhibits a high degree of crystallinity and unique electronic properties. Characterization of photoconductive properties show a weak photoconductive response and indications of a long minority carrier lifetime (4.8 s) and high doping density within the material. The observed photoconductive response is not very intense, but considering that this behavior has not been observed before for α-$Co(OH)_2$, these observations support the suggestion that the biologically inspired, low-temperature solution-based synthesis of inorganic thin films described here may provide an important new route to materials synthesis to facilitate the characterisation of electrochemical properties of both known and new materials.

As noted, the process is generic and not limited to metal hydroxide synthesis. Phosphate, oxide, and nitride syntheses are also possible. The as-synthesized hydroxide-based thin films can be dehydrated and converted to the respective metal oxide films with no change in morphology by heating in air. It may therefore be useful for room temperature fabrication of semiconducting films based on a variety of other materials. Alternatively, the in situ prepared materials can be converted in a post-synthesis step to their respective metal chalcogenides or nitrides, similar to known solid state reactions. Again, the morphology of the thin films is retained during these conversion reactions.

It also bears noting that titanium oxide was directly synthesized from a titanium salt using the method of the present invention, without the need for a subsequent heating step.

2. Extensions of Basic Method a. Substrate Effects; Nanostructured Zinc Oxide Films As alluded to above, introduction of different substrates into the reaction system of the vapor-diffusion catalysis method has effects on the crystallinity and morphology of films grown by heterogeneous nucleation from aqueous $Zn(NO_3)_2$.

The substrates, amorphous glass, indium tin oxide coated glass (ITO), fluorine doped indium tin oxide (FTO), and ZnO (0001), were selected for their differences in crystallinity, crystallographic lattice matching with respect to ZnO and $Zn_5(OH)_8(NO_3)_2 \cdot 2H_2O$, and polycrystalline or epitaxial grown surface morphologies. For amorphous glass, no lattice match is assumed. For the substrates coated with tetragonal polycrystalline ITO and FTO (a=b=4.720(0) Å and c=3.170(0) Å) a lattice mismatch of ~16% can be calculated between the a and b parameter of tetragonal SnO and the c parameter (c=5.517(0) Å) of the monoclinic $Zn_5(OH)_8(NO_3)_2 \cdot 2H_2O$ structure. The calculated mismatch of the c parameter of SnO with respect to hexagonal ZnO (a=b=3.23(0) A) is <3%. The lattice mismatch between $Zn_5(OH)_8(NO_3)_2 \cdot 2H_2O$ and the (0001) face of ZnO is ~6%.

Figure 8A:
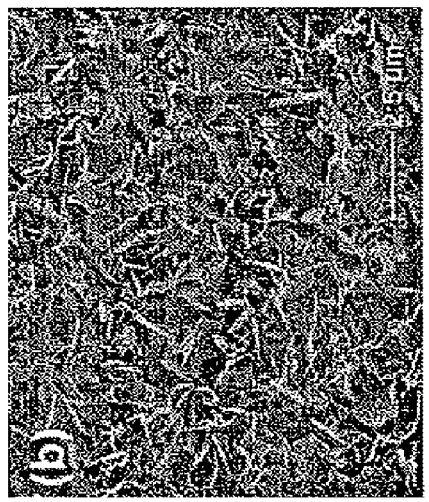
FIGS. 8A-8D are SEM images of thin films grown on different substrates from an aqueous 0.1 M Zn(NO$_3$)$_2$ solution by vapor diffusion catalysts over the course of six hours.
Figure 8B:
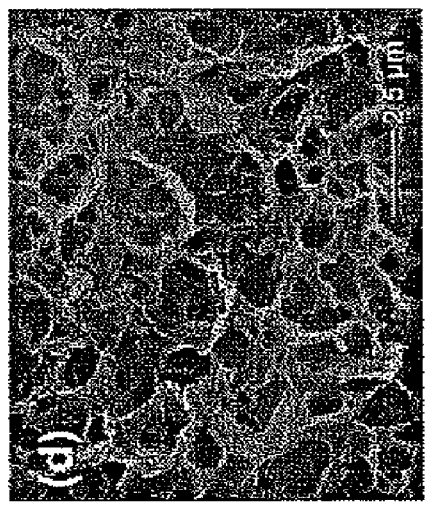
Figure 8C:
Figure 8D:
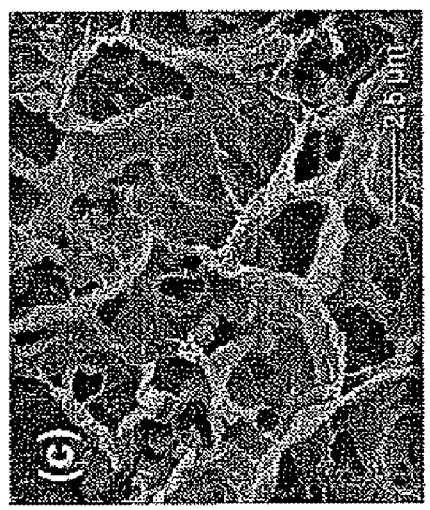

FIGS. 8A-8D are SEM images of the thin films grown on different substrates. FIG. 8A shows $Zn_5(OH)_8(NO_3)_2 \cdot 2H_2O$ on amorphous glass. FIG. 8B shows a combination of $Zn_5(OH)_8(NO_3)_2 \cdot 2H_2O$ and ZnO on in ITO coated glass. FIG. 8C shows a combination of $Zn_5(OH)_8(NO_3)_2 \cdot 2H_2O$ and ZnO is FTO coated glass. FIG. 8D shows ZnO on the (0001) face of epitaxially grown ZnO.

Figure 9:
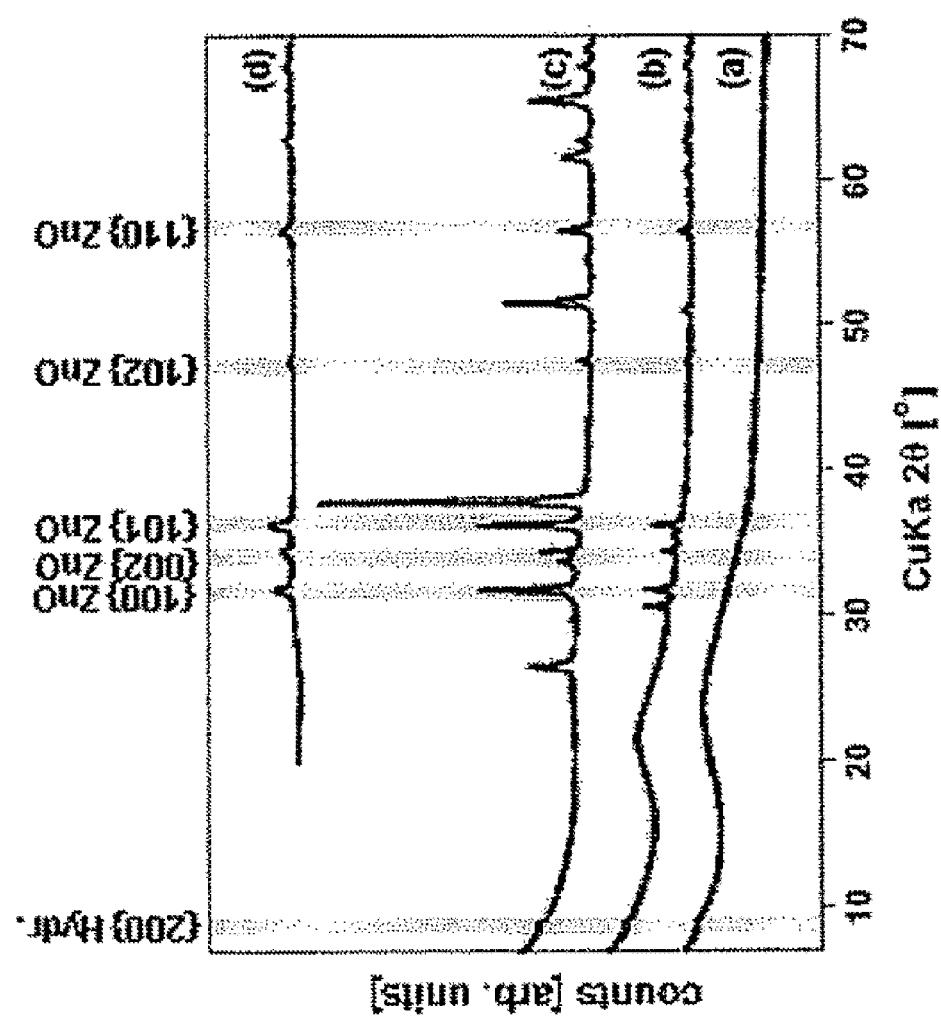
FIG. 9 shows XRD patterns for the thin films shown in FIGS. 8A-8D.

FIG. 9 shows the X-ray diffraction (XRD) pattern of films grown from solution on the respective substrates during a 6-hour exposure of the precursor solution to ammonia vapor at ambient temperature. An increase in crystallinity of the film is observed with increasing crystallinity of the underlying substrate; the signal/noise ration in the XRD spectra increased, and for the thin films grown on FTO or ZnO substrates, no background elevation attributable to amorphous material was detectable. Furthermore, a correlation is observed between the preferred chemical composition of the as-prepared film and the underlying substrate. For the films grown on glass, ITO, and FTO, the 100% peak for $Zn_5(OH)_8(NO_3)_2 \cdot 2H_2O$ at d=9.7 A is visible.

The films grown directly on glass exhibit the lowest crystallinity, and no signals indicating crystalline phases of other materials can be detected. It is concluded from the relative intensities of the 100% peaks of $Zn_5(OH)_8(NO_3)_2 \cdot 2H_2O$ and ZnO (d=0.97 Å and d=2.5 Å, respectively) in diffraction patterns (b) and (c) of FIG. 9 that the as-grown films formed on ITO and FTO are predominantly composed of crystalline ZnO with some traces of crystalline $Zn_5(OH)_8(NO_3)_2 \cdot 2H_2O$. For the film grown on epitaxial ZnO, no traces of crystalline $Zn_5(OH)_8(NO_3)_2 \cdot 2H_2O$ could be detected. An XRD pattern of the material grown on epitaxial ZnO (spectrum (d) of FIG. 9) was recorded with the sample tilted with respect to the X-ray beam to eliminate the otherwise dominant peak at d=2.5 A that results from the underlying epitaxially grown substrate (A control diffraction pattern of the same sample recorded at normal orientation of the instrument stage was recorded for the range 2θ=7-70° but is not shown here). Only peaks that could be indexed to heterogeneously grown hexagonal ZnO were found for the film on the highly crystalline, epitaxially grown ZnO substrate; the peak at d=9.7 Å indicative of crystalline $Zn_5(OH)_8(NO_3)_2 \cdot 2H_2O$ was not observed for this sample. The crystalline correlation length within the deposited ZnO film is ~3 nm. The differences in preferred crystal structure of the films prepared by vapor-diffusion catalysis on the different substrates are attributed to the differences in the number if possible nucleation sites provided and a progressively better lattice match for ZnO in the order of amorphous glass <ITO~FTO<ZnO.

Analysis by scanning electron microscopy (SEM) of the material grown on an amorphous glass substrate reveals thin, submicron-sized plates growing from an apparently continuous backplane (FIG. 8A). The same morphology and habitus of the plates can be detected for the $Zn_5(OH)_8(NO_3)_2 \cdot 2H_2O$/ZnO grown on ITO (FIG. 8B). However, the distance between the plates is smaller, and the density of the plates growing at an ~90° angle with respect to the substrate is higher, resulting in complete coverage of the backplane. The as-grown films on FTO (FIG. 8C) and ZnO (FIG. 8D) are noticeably different in appearance. By XRD, they are characterized as more crystalline and composed predominantly or entirely of ZnO instead of $Zn_5(OH)_8(NO_3)_2 \cdot 2H_2O$. These differences are accompanied by a change in the nanostructure of the film. Individual plates are no longer visible; instead, a continuous layered network results from the nucleation of FTO or ZnO.

Having demonstrated these substrate induced changes in this film morphology, crystallinity, and composition compared to those preciously reported for the unsupported, template-free $Zn_5(OH)_8(NO_3)_2 \cdot 2H_2O$ films, we further analyzed the unsupported films that had grown at the air-water interface in the immediate vicinity surrounding the different substrates. Although the film morphology was influenced by the proximity of the foreign substrates compared to the backplane/plate morphology of the previously described unsupported films, the chemical composition remained unchanged in all cases, the unsupported films (adjacent to the exogeneous substrates) were composed of pure $Zn_5(OH)_8(NO_3)_2 \cdot 2H_2O$. Thus, we can conclude that the changes in chemical composition induced by the substrates do not extend to films grown around them. This is in agreement with the understanding of the vapor-diffusion method indicating that the unsupported films form independently, either at the same time or prior to nucleation of material on the substrate.

Thickness measurements of the substrate-adherent films are in agreement with the observed XRD and SEM data. The $Zn_5(OH)_8(NO_3)_2 \cdot 2H_2O$ film on glass is inhomogeneous in thickness, which can be explained by the observed island nucleation sites seen by SEM. On average, the plates protrude 1.4-1.8 μm from the backplane of the film. During the 6 hour exposure to $Zn(NO_3)_2$ and catalyst, the film on ITO grew to a thickness of 100-200 nm, whereas on FTO, the predominantly ZnO film grew to a thickness of 200-300 nm. The submicron thickness of these films explains why the dominant peaks in the XRD patterns are those that can be indexed to the underlying SnO substrate. In contrast, the continuous 3-dimensional network of ZnO grown on the epitaxially-oriented ZnO substrate is 1.4-1.9 μm thick. This increased thickness is attributed to the increased rate of nucleation as a result of the lattice matching between the product and the substrate.

Figure 10B:
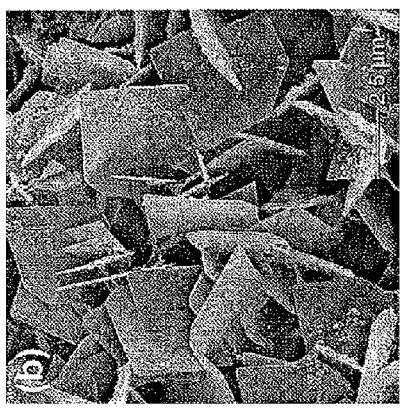
FIGS. 10A-10C are SEM images of thin films at the water-air interface surrounding difference exogeneous catalysts. These thin films were grown on different substrates from an aqueous 0.1 M Zn(NO$_3$)$_2$ solution by vapor diffusion catalysts over the course of six hours.
Figure 11:
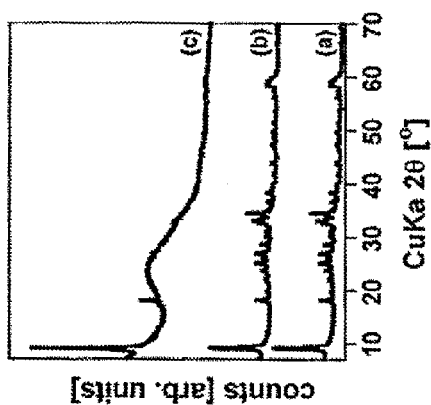
FIG. 11 shows XRD patterns of the thin films shown in FIGS. 10A-10C.
Figure 10A:
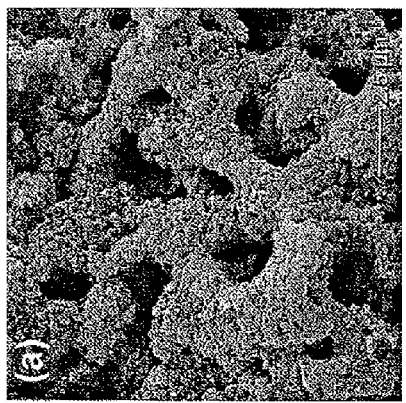
Figure 10C:
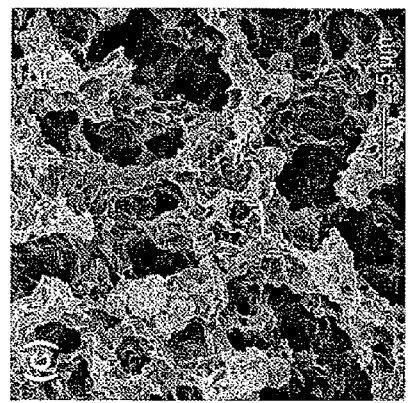

Referring to FIGS. 10A-11, the low intensity of the XRD pattern (FIG. 10D) for the unsupported thin film grown around the exogeneous ZnO substrate is a result of the extremely thin film, rather than a result of any difference in film properties. SEM images show that films nucleated around FTO substrates (FIG. 10B) contain well-defined thin plates growing into the reaction solution. They protrude from a connecting backplane at the air-water interface. In contrast, unsupported films that have been grown in reaction vessels with an amorphous glass substrate present (FIG. 10A) display an ordered, agglomerated network of fused nanocrystals (<500 nm in diameter). A similarly porous network of fused material with no individual nanoparticles visible is observed for films grown in proximity to ZnO substrates (FIG. 10C). Films grown around ITO coated glass (not shown) display the same morphology and degree of crystallinity as the material nucleated in the region surrounding FTO coated glass (FIG. 10B).

All of the observed unsupported films are inhomogeneous in thickness bur appear highly crystalline. The difference in morphology and structure of the unsupported films shown in FIGS. 10A-10C compared to the previously reported template-free $Zn_5(OH)_8(NO_3)_2 \cdot 2H_2O$ films most likely results from the disruption of the air-liquid interface by the substrate.

Thus, the vapor-diffusion catalysts method, in combination with commercially available crystalline substrates such as ITO coated glass, FTO coated glass, or epitaxially grown ZnO, offers an alternative pathway to highly crystalline ZnO thin films with unique nanoscale features. These results further demonstrate the integrability of the kinetically controlled vapor-diffusion synthesis method into existing manufacturing processes such as MOCVD or MBE and extend its potential use as a low-cost alternative to these fabrication methods.

Experimental Details

All starting materials were commercially available and used without further purification. A dilute solution of $NH_4OH$ (0.6%) and a separate solution of 0.1 M $Zn(NO_3)_2$ were placed in the same enclosed chamber. For growth of thin films on different substrates (glass, ITO coated glass, and ZnO), the substrates were floated on the surface of the $Zn(NO_3)_2$ precursor solution. The film on FTO glass was grown by fixing the substrate with tape on the uncoated side, the oxide coated side facing downward, and adjusting the amount of precursor solution until the meniscus touched the substrate surface. The synthesis of zinc hydroxide and oxide thin films, respectively, occurred at room temperature and ambient pressure over the course of six hours.

After formation, the unsupported films were transferred onto a doubly distilled water surface to remove tracing of starting material solution, using a Langmuir-Blodgett technique; the films grown on substrates were cleaned of $Zn(NO_3)_2$ solution by dipping the substrate with the film in doubly distilled water. All films were dried at room temperature under air overnight.

Scanning electron microscopy (SEM) was performed on dried samples using a Tescan Vega 5130 SEM. Powder X-ray diffraction(XRD) was performed using a Bruker D8 diffractometer with monochromatic Cu Kα radiation (λ=1.540 Å). For measurements on ZnO substrates, a program was used in which the detectors of the diffractometer were offset by 14° so the dominant peak from the underlying substrate does not show up in the spectrum. All detected signals for samples containing ZnO substrates are due to the film grown by the vapor-diffusion method, not to the substrate. For all other substrates, peaks from the underlying substrates were visible; main peaks that can be indexed to the grown Zn-containing films on top of the substrates are clearly marked in FIG. 9. The crystalline correlation length for the material grown on the epitaxial ZnO substrate was calculated with the Scherrer formula using the FWHM of the 100 and 002 reflections. The film thicknesses were determined using a DekTak[3] Surface Profilometer.

b. Perovskite Nanoparticles; Crystalline Barium Titanate

The fundamental mechanisms underlying enzyme-mediated biomineralization have been translated to an approach wholly controlled by chemical physics, which uses vapor diffusion to establish temporal and vectorial catalyst gradients for the slow growth of nanocrystals at room temperature and ambient pressure. We have developed a vapor-diffusion sol-gel route to well-defined crystalline 6 nm $BaTiO_3$ nanoparticles at low temperatures, in the absence of a structure-directing template.

Nanoparticles of $BaTiO_3$ were readily prepared by the kinetically controlled vapor diffusion of $H_2O$ (g)/HCl (g) into non-aqueous solution of the single-source bimetallic alkoxide $BaTi[OCH_2CH(CH_3)OCH_3]_6$ at 16° C.

$$BaTi(OCH_2CHCH_3(OCH_3))_6 + 3H_2O(g) \rightarrow BaTiO_3 + 6HOCH_2CH(CH_3)OCH_3 \quad (1)$$

(HCl(g), cat.; 16° C.)

Figure 12:
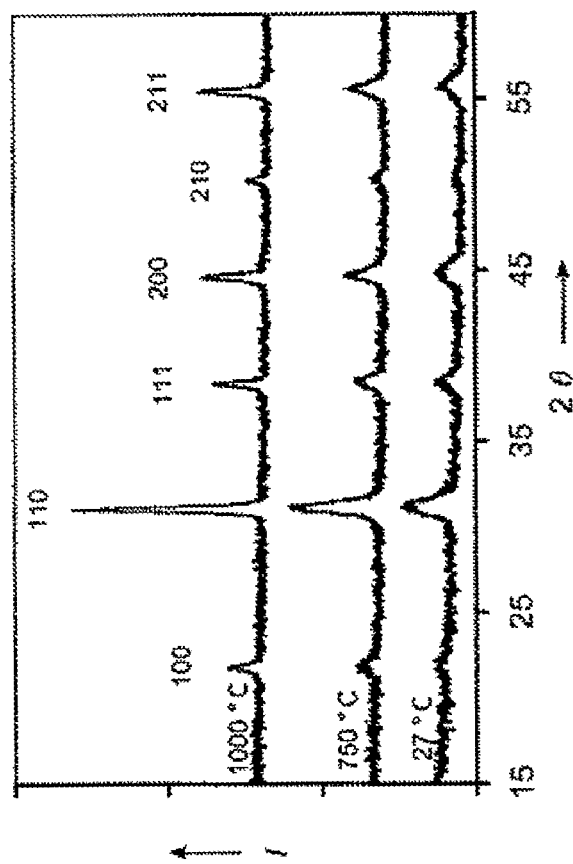
FIG. 12 shows the powder XRD patterns of BaTiO$_3$ nanoparticles heated in situ to the indicated temperatures.

Powder X-ray diffraction analysis of the as-prepared material revealed that the nanoparticles consist of crystalline $BaTiO_3$ with the cubic perovskite structure (space group Pm3m; FIG. 12). The thermodynamically stable polymorph of bulk $BaTiO_3$, on the other hand, is the noncentrosymmetric tetragonal phase (space group P4 mm), which is a room-temperature ferroelectric material. The lattice constant of a=4.052 (±0.016) Å calculated for the nanoparticles is in excellent agreement with the literature value of a=4.058 Å for cubic $BaTiO_3$ (JCPDS no. 75-0215). Crystalline impurities, such as $TiO_2$ or $BaCO_3$, were not detected by XRD. In situ heating of the nanoparticles to 750 and 1000° C. causes an incremental increase in particle size to 14 and 32 nm, as a result of the coalescence and agglomeration of the nanoparticles (FIG. 12). Similarly, other researchers obtained 40 nm $BaTiO_3$ nanoparticles after heating 6 nm particles to 700° C.

Figure 13B:
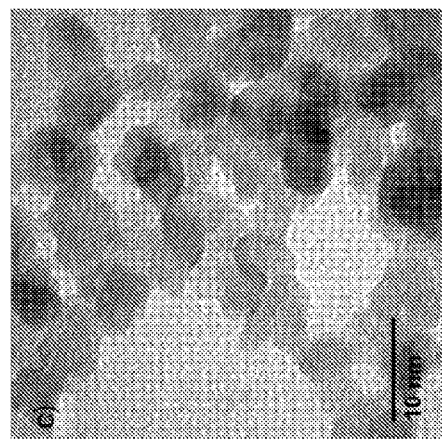
FIG. 13A-13C are TEM images of the BaTiO$_3$ nanoparticles at different resolutions.
Figure 13C:
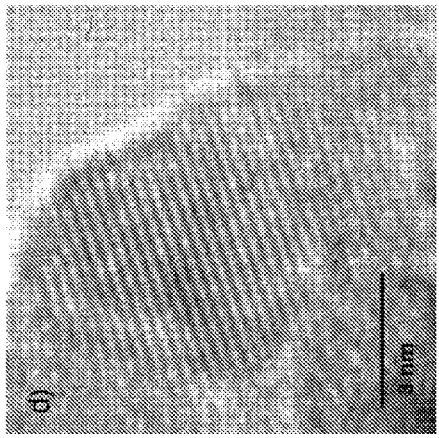
Figure 13A:
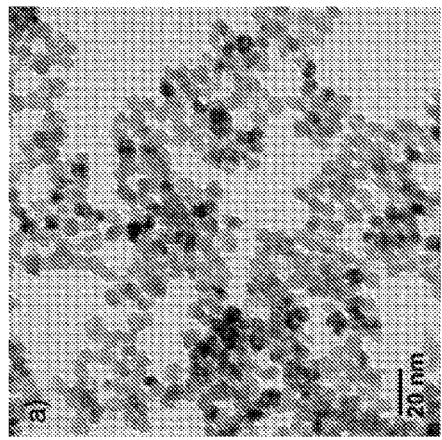
Figure 14:
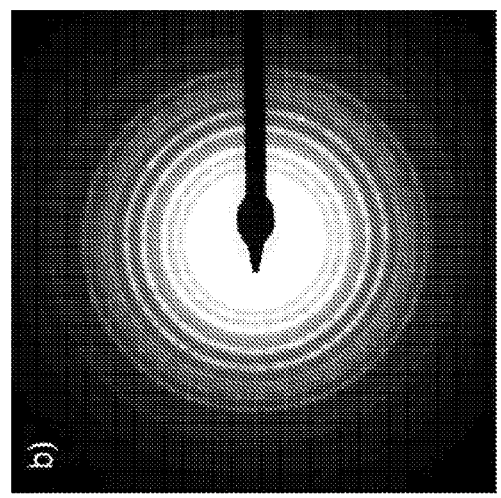
FIG. 14 is an SAED pattern of the BaTiO$_3$ nanoparticles.

Further structural characterization was performed by transmission electron microscopy (TEM). An assembly of quasi-spherical BaTiO3 nanoparticles, which are partially agglomerated owing to the absence of surface-stabilizing ligands, is shown in FIGS. 13A, 13B. The nanoparticles have a mean diameter of 5.9±0.1 nm, as measured by TEM, which is in good agreement with the particle size determined by Scherrer analysis of the XRD pattern. A representative selected area electron diffraction (SAED) pattern for the cubic $BaTiO_3$ nanoparticles is presented in FIG. 14. The lattice constant (a=4.038 (±0.047) Å) calculated from randomly selected SAED patterns is in agreement with that determined by XRD. A TEM image of an apparent single-crystalline nanoparticle (oriented along the [110] direction), showing the lattice fringes, is displayed in FIG. 13C.

Figure 15:
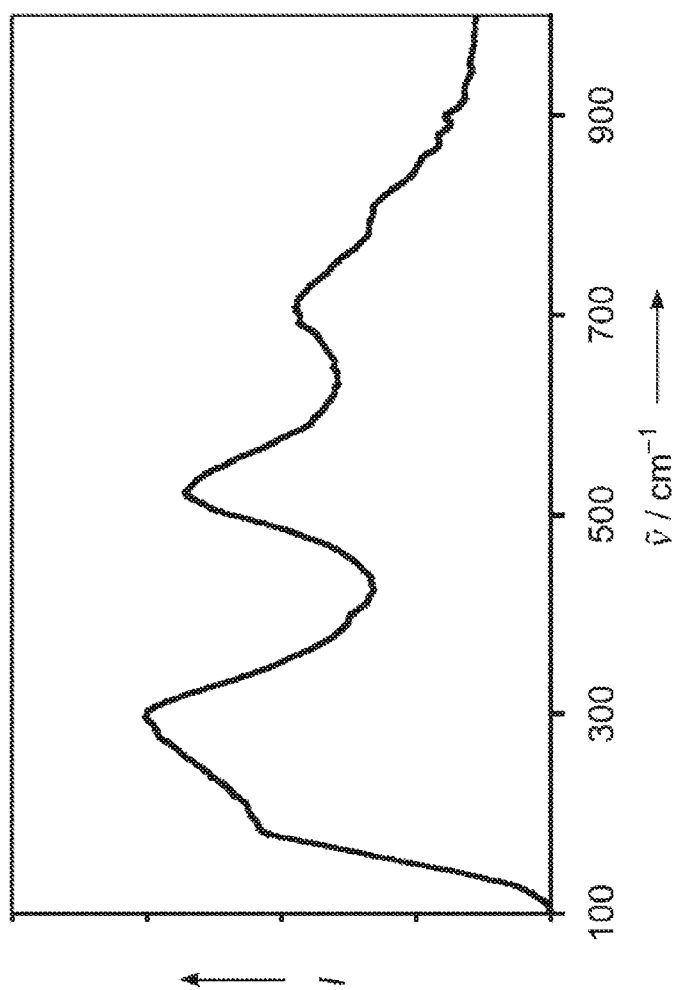
FIG. 15 is a Raman spectrum of the BaTiO$_3$ nanoparticles.

Whereas XRD provides information on long-range order, Raman spectroscopy is a useful technique for probing the structure of the $BaTiO_3$ nanoparticles at the atomic scale, on the basis of vibrational symmetry. Cubic $BaTiO_3$ inherently has no Raman active modes; however, Raman active modes are expected for the noncentrosymmetric tetragonal structure. The spectrum of the as-prepared nanoparticle displays bands at 712 cm$^{-1}$ [$B_1$, E(TO)], all of which suggest local tetragonal distortion (FIG. 15). Even though XRD analysis indicates a cubic perovskite structure, the observed Raman active modes imply a certain degree of tetragonality on the atomic scale.

X-ray photoelectron spectroscopy (XPS) was used to confirm the $Ba^{2+}$ and $Ti^{4+}$ oxidation states and coordination environments, as well as to verify the composition of the nanoparticles. The Ba $3d_{5/2}$ and Ti $2P_{3/2}$ binding energies measured for the nanoparticles were 778.3 and 457.8 eV, respectively, which are in excellent agreement with reported values of 778.9 and 458.2 eV. The average surface ratio of Ba:Ti was determined to be 1.3:1, and the XPS spectra did not reveal any contamination by elements other than carbon and chlorine (0.2 wt %). Combustion analysis confirmed a residual carbon content of 3.4 wt %, which presumably results from unhydrolyzed alkoxide ligands. This hypothesis is supported by the observation of Raman bands at 2880 and 2938 cm$^{-1}$ that are indicative of C—H stretches. Moreover, no $CO_3^{2-}$ impurity was detected by Raman spectroscopy.

In bimetallic single-source molecular precursors, two metals A and B are present in a pre-existing geometric relationship. Such precursors have been demonstrated to produce a higher abundance of A-O—B bonds upon conversion to the bimetallic oxide by conventional high-temperature methods (for example, pyrolysis or metal-organic chemical vapor deposition (MOCVD)). Utilizing a single-source bimetallic alkoxide in our vapor-diffusion approach yields highly crystalline $BaTiO_3$ nanoparticles at 16° C., whereas utilizing two separate barium and titanium 2-propoxides as precursors yields an amorphous material under identical conditions. Furthermore, simply adding water (2-100 equiv) to the bimetallic alkoxide yields an amorphous material at 16° C., a result which is similar to that reported by others. Thus, it is the marriage of the single-source bimetallic alkoxide and its temporally controlled catalytic hydrolysis/polycondensation that provides the necessary conditions for the facile crystallization and growth of small, well-defined $BaTiO_3$ nanoparticles at a very low temperature. Previous syntheses at very low temperatures have produced larger (ca. 50 nm), ill-defined particles.

Thus, a vapor-diffusion sol-gel method is presented that, for the first time, offers a pathway to small, well-defined $BaTiO_3$ nanoparticles at very low temperatures. The synthesis is based on the delivery of water and catalyst in a spatial and temporal gradient to promote the slow, kinetically controlled growth of highly crystalline 6 nm nanoparticles, which are among the smallest reported for $BaTiO_3$. By varying the single-source bimetallic precursor, this methodology may be extended to the synthesis of other perovskite nanoparticles. The ability to rationally synthesize a wide range of technologically interesting perovskite nanoparticles in a controlled manner represents a significant step toward the miniaturization and development of next-generation devices, such as FeRAM, positive temperature coefficient of resistivity (PTCR) materials, and uncooled IR detection.

Experimental Details

All manipulations were performed under an inert atmosphere, and solutions were degassed prior to use. An aqueous solution of HCl (0.75 M, 2 mL) and a separate solution of $BaTi[OCH_2CH(OCH_3)OCH_3)]_6$ (0.42 M; Gelesi, Inc.) in n-butanol (0.45 mL) and 2-methoxy propanol (0.75 mL) were placed in an enclosed chamber under argon. The solution containing the bimetallic alkoxide was them exposed to the $H_2O$/HCl vapor over 15 hours at 16° C. to produce the $BaTiO_3$ nanoparticles. The gel product was collected, rinsed with n-butanol (3×2 mL), and dried in vacuo. The as-prepared powder was off-white in appearance and could be dispersed in several common organic solvents (for example, THF, hexane, and toluene) with sonication.

XRD was performed on a Bruker D8 Advance X-ray diffractometer with an Anton-Parr HTK 16 high-temperature stage, using $CU_{K_\alpha}$ radiation. TEM was done on an FEI Tecnal $G^2$ Sphera microscope at an operating voltage of 200 kV. SAED patterns were collected at a camera distance of 100 cm for areas selected at random (15 areas on independently prepared samples). The average lattice parameters were determined from the 200 reflection of XRD patterns and from the 320 reflection of SAED patterns. XPS was done on a Kratos Axis Ultra system with a monochrome aluminum anode. The binding energy of C 1 s in all spectra was standardized to 285 eV. Raman spectra were obtained on a Nicolet Magna 850 IR/Raman spectrometer. Combustion analyses were performed at the MSI Analytical Lab at UCSB.

c. Other Materials and Uses Regarding the Instant Invention

Figure 17:
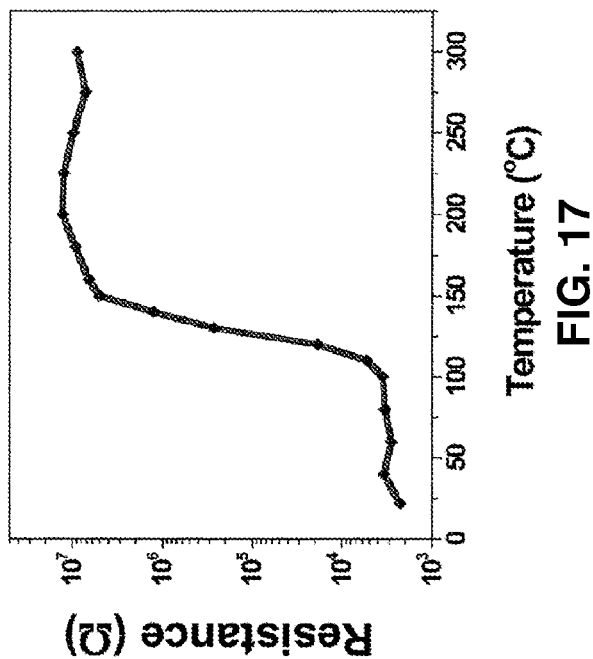
FIG. 17 shows the resistance behavior of 0.16 atom % La—TiBaO$_3$ sintered in air to 1100° C.
Figure 16:
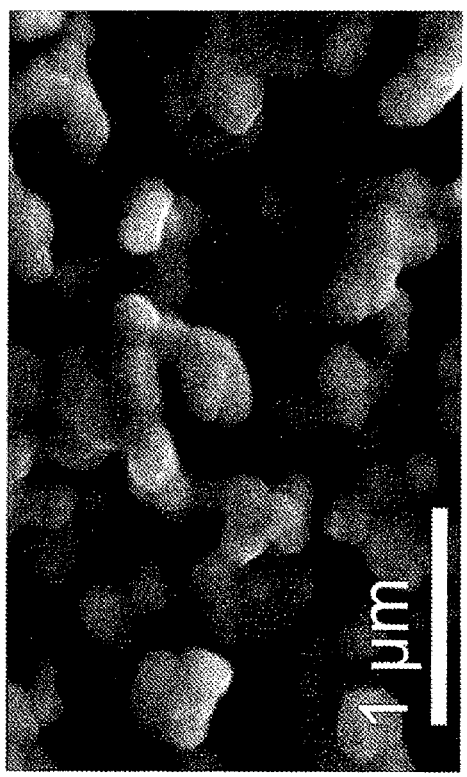
FIG. 16 shows the microstructure of 0.16 atom % La—TiBaO$_3$ sintered in air to 1100° C.

FIGS. 16 and 17 show the microstructure and resistance behavior, respectively, of 0.16 atom % $La-BaTiO_3$ (see Equation 2) sintered in air to 1100° C. $La-BaTiO_3$ is an example of a material made according to the instant invention having a "positive temperature coefficient of resistivity" (PTCR). That is, a material that, at low temperatures acts as a conductor, but at higher temperatures, changes to an insulator. Other donor-doped $BaTiO_3$ materials exhibit this behavior as well, and can be made using the methods disclosed herein.

$$BaTi(OCH_2CHCH_3(OCH_3))_6 + La^{3+} + H_2O(g) \rightarrow La\text{-}BaTiO_3 + 6HOCH_2CHCH_2(OCH_3) \quad (2)$$

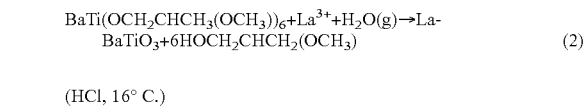

(HCl, 16° C.)

Figure 18:
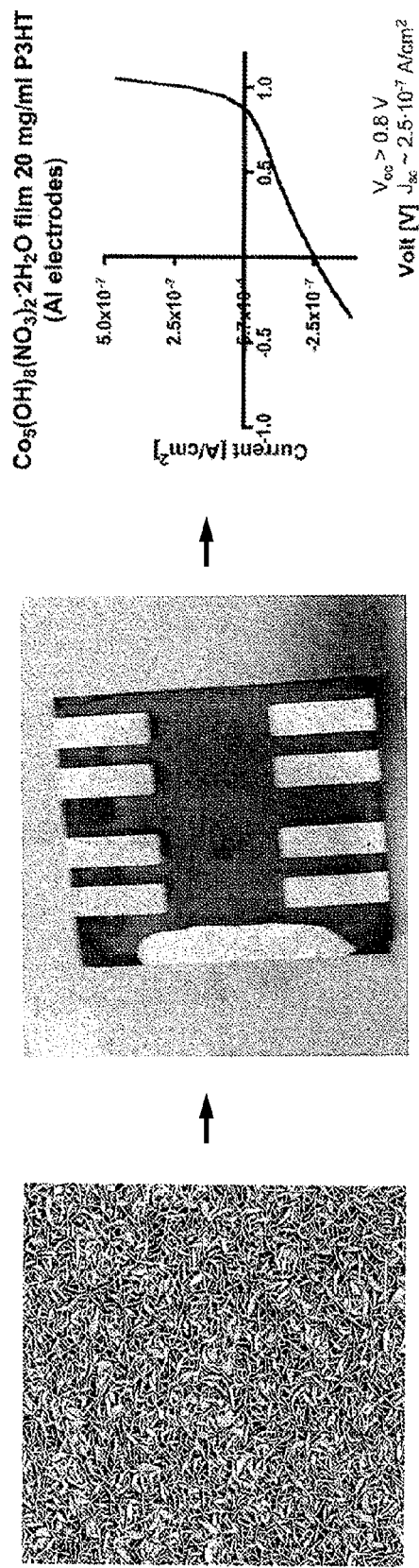
FIG. 18 shows the use and behavior of a cobalt hydroxide thin film as an active p-type photovoltaic material.

FIG. 18 shows the use and behavior of a cobalt hydroxide thin film as an active p-type photovoltaic material. Other materials formed by the instant invention can be utilized in a similar manner.

Figure 20:
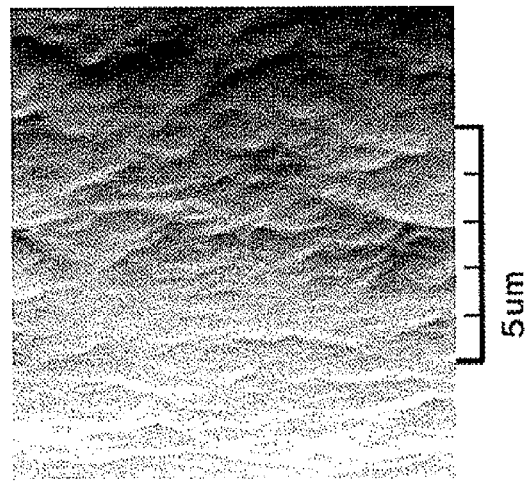
FIG. 20 shows the continuous TiO2 thin film made by the kinetically controlled, low temperature method of the instant invention.
Figure 19:
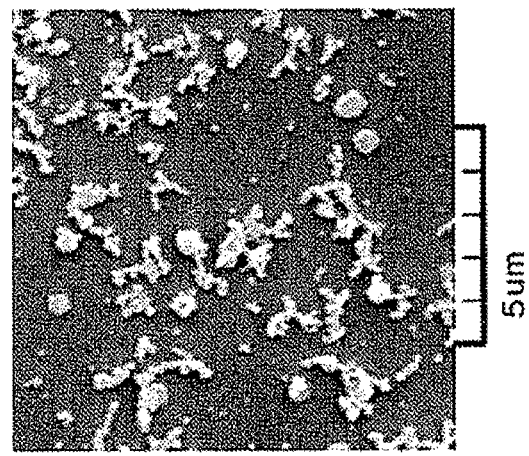
FIG. 19 shows a discontinuous particulate TiO2 film made by a conventional sol-gel method.

For purposes of comparison, FIG. 19 shows a discontinuous particulate $TiO_2$ film made by a conventional sol-gel method, while FIG. 20 shows the continuous $TiO_2$ thin film made by the kinetically controlled, low temperature method of the instant invention.

It is noted that the material that is formed is either p-type or n-type, depending on the chemical composition of the material. For example, the cobalt hydroxide material described herein is intrinsically p-type, while the zinc oxide formed by the same method is intrinsically n-type. Thus, either p-type or n-type materials can be produced according to the methods described.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| HYDROXIDES | PHOSPHATES | OXIDES |
| --- | --- | --- |
| cobalt | cobalt | cobalt |
| zinc | zinc | zinc |
| manganese | manganese | manganese |
| iron | iron | iron |
| scandium | nickel | scandium |
| strontium | chromium | strontium |
| nickel | gallium | nickel |
| copper | cadmium | copper |
| gallium | thallium | gallium |
| cadmium | indium | cadmium |
| zirconium | calcium | zirconium |
| lead | barium | lead |
| bismuth | | bismuth |
| lanthanum | | lanthanum |
| cerium | | cerium |
| gadolinium | | gadolinium |
| erbium | | erbium |
| ytterbium | | ytterbium |
| chromium | | titanium |
| titanium | | indium |
| vanadium | | chromium |
| indium | | vanadium |

What is claimed is:

1. A kinetically controlled method for producing a nanostructured material, comprising:
   providing a molecular precursor;
   dissolving said precursor in a solvent and forming a solution;
   placing said solution in a closed environment at low temperature;
   introducing a catalyst into said closed environment, said catalyst comprising a volatile catalyst of hydrolysis that is delivered to said solution by gas diffusion;
   wherein a hydrolysis reaction of said precursor occurs, as initiated by said gas diffusion delivered catalyst, thereby generating a crystalline product;
   wherein crystalline growth occurs as a result of said precursor hydrolysis reaction that produced said crystalline product;
   wherein said crystalline growth forms as a thin film or as individual nanocrystalline particles; and
   wherein said nanostructured material comprises an oxide material selected from the group consisting of cobalt hydroxide, a cobalt hydroxide based material, a titanium dioxide based material, a tin oxide based material, an indium tin oxide based material, a zinc oxide based material, a metal oxide, a metal hydroxide, a metal phosphate, a metalloid oxide, a metalloid hydroxide, a metalloid phosphate, an organometallic oxide, an organometallic hydroxide, an organometallic phosphate, an organometalloid oxide, an organometalloid hydroxide, and an organometalloid phosphate.

2. A kinetically controlled method for producing a nanostructured material, comprising:
   providing a molecular precursor;
   dissolving said precursor in a solvent and forming a solution;
   placing said solution in a closed environment at low temperature;
   introducing a catalyst into said closed environment, said catalyst comprising a volatile catalyst of hydrolysis that is delivered to said solution by gas diffusion;
   wherein a hydrolysis reaction of said precursor occurs, as initiated by said gas diffusion delivered catalyst, thereby generating a crystalline product;
   wherein crystalline growth occurs as result of said precursor hydrolysis reaction that produced said crystalline product; and
   wherein said crystalline growth forms as a thin film or as individual nanocrystalline particles; and
   introducing said catalyst as a sublimable solid.

3. A kinetically controlled method for producing a nanostructured material, comprising:
   providing a molecular precursor;
   dissolving said precursor in a solvent and forming a liquid solution;
   placing said liquid solution in a closed environment at low temperature; and
   introducing a gas phase catalyst into said closed environment, said catalyst comprising a volatile catalyst of hydrolysis that is delivered to said by gas diffusion, thereby forming a gas-liquid solution interface between said gas phase catalyst of hydrolysis and said liquid solution;
   wherein a hydrolysis reaction occurs of said precursor, as initiated by said gas diffusion delivered catalyst, thereby generating a crystalline product;
   wherein crystalline growth occurs as result of said precursor hydrolysis reaction that produced said crystalline product;
   wherein said crystalline growth forms as a thin film or as individual nanocrystalline particles; and
   wherein ammonia is diffused through said gas phase and dissolved at said gas-liquid interface.

4. A kinetically controlled method for producing a nanostructured material, comprising:
   providing a molecular precursor;
   dissolving said precursor in a solvent and forming a solution;
   placing said solution in a closed environment at low temperature;
   introducing a catalyst into said closed environment, said catalyst comprising a volatile catalyst of hydrolysis that is delivered to said solution by gas diffusion;
   wherein a hydrolysis reaction occurs of said precursor, as initiated by said gas diffusion delivered catalyst, thereby generating a crystalline product;
   wherein crystalline growth occurs as result of said precursor hydrolysis reaction that produced said crystalline product;

wherein said crystalline growth forms as a thin film or as individual nanocrystalline particles; and subsequently heating said thin film or individual nanocrystalline particles, wherein an oxide form of said thin film or individual nanocrystalline particles is formed without loss of morphology.

5. A method as recited in claim 1, 2, 3 or 4, wherein said nanostructured material comprises a semiconducting, photoconductive, photovoltaic, optoelectronic, battery or other material having a crystalline structure with nanoscale order.

6. A method as recited in claim 2, 3 or 4, wherein said nanostructured material comprises an oxide material selected from the group consisting of cobalt hydroxide, a cobalt hydroxide based material, a titanium dioxide based material, a tin oxide based material, an indium tin oxide based material, a zinc oxide based material, a metal oxide, a metal hydroxide, a metal phosphate, a metalloid oxide, a metalloid hydroxide, a metalloid phosphate, an organometallic oxide, an organometallic hydroxide, an organometallic phosphate, an organometalloid oxide, an organometalloid hydroxide, and an organometalloid phosphate.

7. A method as recited in claim 1, 2, 3 or 4, wherein said precursor comprises a hydrolyzable molecular complex, compound or salt of a material selected from the group consisting of a metal, a metalloid, an organometallic, and an organometalloid.

8. A method as recited in claim 1, 2, 3 or 4, wherein said precursor comprises a precursor of a chalcogen or perovskite, or mixture of chalcogens or perovskites.

9. A method as recited in claim 1, 2, 3 or 4, wherein said solvent comprises a high dielectric solvent.

10. A method as recited in claim 1, 2, 3 or 4, wherein said closed environment comprises an air or inert gas environment.

11. A method as recited in claim 1, 2, 3 or 4, wherein said catalyst is selected from the group consisting of ammonia, water, cysteamine, volatile organic acids, volatile inorganic acids, volatile organic bases, and volatile inorganic bases.

12. A method as recited in claim 1, 2, 3 or 4, further comprising controlling the vectorial gradient of the catalyst in both space and time.

13. A method as recited in claim 12, further comprising controlling said vectorial gradient by controlling vapor diffusion and solubilization at a gas-liquid interface.

14. A method as recited in claim 1, 2, 3 or 4, wherein said thin film or individual nanocrystalline particles comprises plates of highly oriented p-type or n-type semiconducting nanocrystals connected to an electronically conductive flat backplane of said plates.

15. A kinetically controlled method of producing nanocrystalline perovskite materials and doped variants thereof, the method comprising the steps:

(a) mixing together molecular precursors in a solution; and (b) synthesizing the nanocrystalline perovskite materials from said mixture of molecular precursors in low temperature conditions by gaseous phase delivery of a hydrolysis catalyst into said mixture of molecular precursors in the absence of a structure-directing template, thereby generating nanocrystalline perovskite materials, wherein said nanocrystalline perovskite materials are well-defined and on the order of approximately 6 nm.

* * * * *